United States Patent [19]
Walker et al.

[11] Patent Number: 5,963,911
[45] Date of Patent: Oct. 5, 1999

[54] RESOURCE ALLOCATION

[75] Inventors: Paul Walker, Bolton; Robert N. W. Laithwaite, Near Ipswich; John Denman, Ipswich; David Morton, South Croydon; Gerwyn L. Williams; Mike Jubb, both of London; Alan Taylor, Merseyside, all of United Kingdom

[73] Assignee: British Telecommunications public limited company, London, United Kingdom

[21] Appl. No.: 08/720,199

[22] Filed: Sep. 25, 1996

Related U.S. Application Data

[63] Continuation of application No. PCT/GB95/00587, Mar. 17, 1995, which is a continuation-in-part of application No. 08/301,770, Sep. 7, 1994, abandoned.

[30] Foreign Application Priority Data

Mar. 25, 1994 [EP] European Pat. Off. .............. 94302163
Aug. 17, 1994 [GB] United Kingdom .................. 9416596

[51] Int. Cl.$^6$ ..................................................... G06F 19/00
[52] U.S. Cl. ................ 705/7; 705/8; 705/9; 364/468.05; 364/468.06; 364/468.07
[58] Field of Search .......................................... 705/7, 8, 9

[56] References Cited

U.S. PATENT DOCUMENTS

| | | | |
|---|---|---|---|
| 4,852,001 | 7/1989 | Tsushima | 364/401 |
| 4,866,628 | 9/1989 | Natajaran | 364/468 |
| 5,006,983 | 4/1991 | Wayne | 364/401 |
| 5,077,661 | 12/1991 | Jain | 364/402 |
| 5,111,391 | 5/1992 | Fields | 364/401 |
| 5,155,679 | 10/1992 | Jain | 364/402 |
| 5,216,593 | 6/1993 | Dietrich | 364/402 |
| 5,291,394 | 3/1994 | Chapman | 705/8 |
| 5,291,397 | 3/1994 | Powell | 364/402 |
| 5,295,065 | 3/1994 | Chapman | 364/401 |
| 5,392,429 | 2/1995 | Agrawai | 395/650 |
| 5,442,730 | 8/1995 | Bigus | 395/22 |
| 5,467,268 | 11/1995 | Sisley | 364/401 |

OTHER PUBLICATIONS

Garwood, G.J. and Robinson, A.C., Work Management System, British Telecommunications Engineering, pp. 204–210, Oct. 1991.

*Primary Examiner*—Allen R. MacDonald
*Assistant Examiner*—Jagdish Patel
*Attorney, Agent, or Firm*—Nixon & Vanderhye P.C.

[57] ABSTRACT

In order to optimize the utilization of resources (e.g., technicians) in performing a number of jobs, each job is assigned a cost time-dependent function and each resource is assessed for the time at which it will be available. For each combination of jobs with resources, an actual can be determined. The combination giving the lowest overall cost is then determined. Additional features are disclosed to ensure incompatible job/resource combinations are not allocated, and to reduce the complexity of the calculation by prioritizing the jobs and resources.

38 Claims, 18 Drawing Sheets

Fig. 16

|      | J4   | J5  | J6  | J7  |
|------|------|-----|-----|-----|
| T1   | 2    | (1) | 3   | 3   |
| T2   | 3    | 4   | 2   | (2) |
| T3   | 4    | 6   | (2) | 2   |
| DUMMY| (15) | 16  | 18  | 17  |

Fig. 17

|      | J4   | J8  | J6  | J7  |
|------|------|-----|-----|-----|
| T1   | 2    | 3   | 3   | (3) |
| T2   | 3    | (1) | 2   | 2   |
| T3   | 4    | 3   | (2) | 2   |
| DUMMY| (15) | 17  | 18  | 17  |

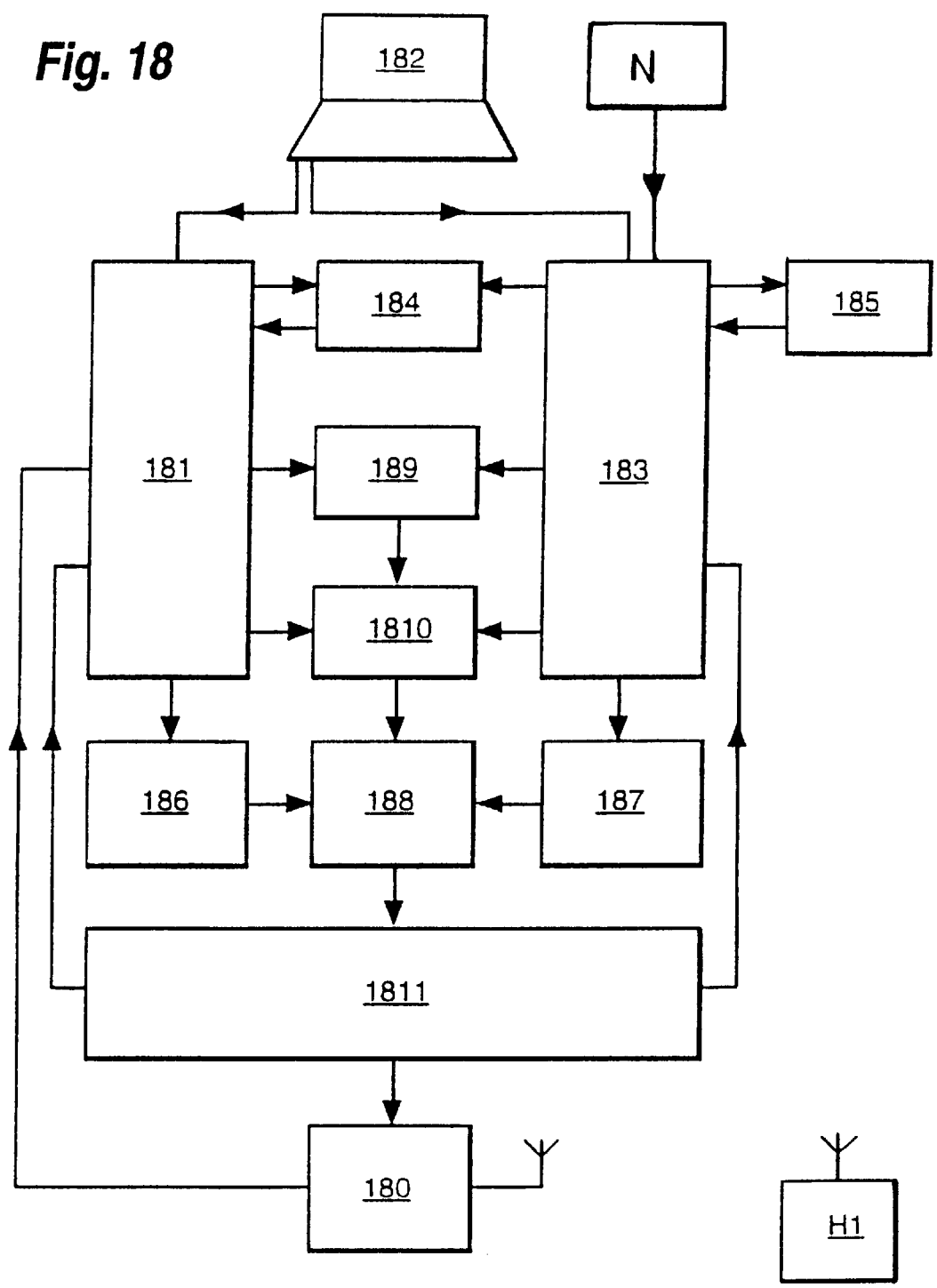
Fig. 18
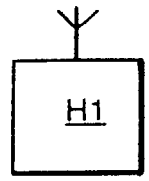
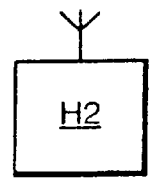

5,963,911

RESOURCE ALLOCATION

CROSS-REFERENCE TO RELATED APPLICATION

This application is a continuation (under 35 USC §120/365) of copending PCT/GB95/00587 designating the U.S. and filed Mar. 17, 1995 as, in turn, a continuation-in-part (under 35 USC §120/365) of copending U.S. application Ser. No. 08/301,770 filed Sept. 7, 1994 now abandoned.

BACKGROUND OF THE INVENTION

1. Field of the Invention

This invention relates to a method for optimising the allocation of a plurality of resources to a plurality of jobs and to a apparatus for performing such a method. It is particularly suited for use in situations where the availability of resources and the jobs to be performed both change dynamically. An example of such a situation is the allocation of jobs to a field force of operatives, for example ambulance or taxi drivers, a vehicle repair call out field force, or a maintenance field force for a distributed system such as a power or water supply or telecommunications network.

2. Related Art

An article entitled 'Work Management System', by G J Garwood and A C Robinson (British Telecommunications Engineering Journal, Vol 10 No 3 October 1991, pages 204–210) describes a system for allocating jobs to individual field technicians. One element of this system handles unplanned work (as distinct from scheduled or "appointment" work) to handle repairs to faults.

In such situations the workload is highly variable and volatile, and jobs have to be allocated in real time since the necessary response times are of the order of the lengths of the jobs themselves, and very much shorter than an operative's working day. The durations of the individual jobs are themselves highly variable which affects resource availability for those jobs awaiting allocation.

The reference cited above describes in general terms a real-time algorithm which takes into account various attributes of the individual members of the field force (such as their current location, skills forecast time to availability etc.) and jobs required, (such as the skills required to perform them, and their "time to jeopardy": i.e. the time by which the job is to be performed).

Various cost analysis algorithms are known for allocating jobs to resources, such as the so called "Hungarian algorithm" described in a 1955 paper by H W Kuhn "The Hungarian Method for the Assignment Problem" (Naval Research Logistics Quarterly, Vol 2, pages 83–97) and developed further by M B Wright "Speeding up the Hungarian Algorithm", Computer Operations Research Vol 17 No 1 pages 95-96 (1990). However the use of these algorithms in real situations is not easy.

SUMMARY OF THE INVENTION

According to a first aspect of the invention there is provided a method of allocating a plurality of resources to a plurality of jobs, by using a computer to perform the following steps:
determining the time at which each resource is forecast to become available;
determining the time at which each job is required to be performed;
assigning to each job a time-dependent cost function calculated as a function of the time at which the job will be performed;
for each possible combination of jobs with resources, determining the total projected cost, dependent on the time at which each resource is forecast to be available and the value of the cost function for the respective job at that time;
determining the combination which produces the smallest total projected cost.

The method may be operated such that when a resource becomes available the steps described above are performed, the available resource then being assigned to the job which is associated with it in the smallest cost combination identified by the above procedure.

New jobs may be added to the plurality of jobs, the method described above being performed when such additions take place.

If a second resource becomes available at or near to its forecast time and no other changes have occurred since the optimisation determination was last performed, the second resource may be assigned the job already allocated to it in the lowest-cost combination previously calculated.

The method may be arranged such that combinations of resources and jobs which are incompatible are ascribed substantially infinite cost values. If it is desired to allocate a specific resource to a job, it may be arranged that combinations of that job with other resources are treated as incompatible.

The jobs may be prioritised on the basis of the times at which they to be performed, and the resources may be prioritised on the basis of which are forecast to become available first. The cost evaluation may be performed for a predetermined number of the jobs, being those having the highest priority.

The method may allow low priority jobs to be interrupted to allow a high priority job to be done instead.

If more jobs are available than resources, dummy resources may be included in the analysis. High values are allotted to the cost functions of jobs allocated to such resources.

A group of jobs which are closely related may be represented by a single job in the calculation of cost scores, other jobs of the group being assigned to the same resource if they are compatible.

According to a second aspect of the invention there is provided apparatus for allocating a plurality of resources to a plurality of jobs comprising:
means for storing parameters relating to the resources;
means for storing parameters relating to the jobs;
means for determining from the parameters the time at which each resource is forecast to become available;
means for determining from the parameters the time at which each job is required to be performed;
means for assigning to each job a cost function which is calculated as a function of the time at which the job will be performed;
means for determining, for each possible combination of jobs with resources, the projected cost, dependent on the time at which each resource is forecast to be available and the value of the cost function for the respective job at that time;
means for determining the combination which produces the smallest total projected cost.

According to a further aspect, there is provided a computer apparatus for allocating a plurality of jobs to a plurality of resources, said computer apparatus comprising a central processing unit, a memory, an input device and an output device, said memory containing a program for controlling the computer and which is arranged:

to store parameters relating to the resources;

to store parameters relating to the jobs;

to determine from the parameters the time at which each resource is forecast to become available;

to determine from the parameters the time at which each job is required to be performed;

to assign to each job a cost function which is calculated as a function of the time at which the job will be performed;

to determine, for each possibile combination of jobs with resources, the projected cost, dependent on the time at which each resource is forecast to be available and the value of the cost function for the respective job at that time; and to determine the combination which produces the smallest total projected cost.

By assigning a time-dependent cost function to each job, the fact that different resources would perform it at different times, and the consequences of this, such as failure to meet an agreed time, can be taken into account.

Means may be provided for adding new jobs to the plurality of jobs. Means may also be provided for identifying incompatible combinations of jobs with resources and ascribing infinite cost values to such combinations.

There may also be means for selectively allocating a specified resource to a given job, arranged so that combinations of such a job with other resources are identified as incompatible.

Means may also be provided for prioritising jobs and/or resources, and for selecting the jobs and resources with the highest priority on which to perform the cost evaluation.

Allocation equipment as described above may be provided in combination with a plurality of communications terminals for use by the resources, and with a communications network for communicating between the terminals and the control apparatus.

Advantageously, these terminals may store details of a second job provisionally allocated to the resource by the allocation equipment, but only reveal these details if an attempt to report completion of a first job fails to communicate with the allocation apparatus.

The terminals are preferably portable, and may communicate with the allocation equipment either by a radio network or by a fixed telecommunications network to which the terminals may be connected. They send information to the allocation equipment, as well as receiving instructions from it.

In this invention, the performance of the job and the availability of the resource are calculated as time-dependent functions, with a greater cost weighting being applied to resource-job combinations with a greater likelihood of failing to achieve a target time.

In a preferred arrangement only resources which have completed their current job are informed of the next job allocated to them. Other allocations are provisional and may be changed in response to changed circumstances, e.g. new jobs being requested, or a resource reporting a job completion earlier or later than the estimated time. In a particularly preferred arrangement the job allocation procedure is normally performed whenever a resource reports its current job completed, but if there have been no changes such as new job requests since the last run of the allocation procedure, and if the resource has reported job completion close to the projected completion time, the results of the last run of one procedure are used instead.

The allocation procedure may also be performed when significant changes take place such as the addition of new jobs. This allows the current allocation to keep up with such developments, so that when a resource requests a job the system can respond with an assigned job immediately without having to run the allocation procedure. However, if a resource reports job completion earlier than predicted, this is itself a significant change which would require re-running of the allocation procedure.

In certain circumstances there may be resources which are unable to perform certain jobs. This would apply for example where a job requires a specific skill, or where an item of equipment is needed which is only held by some of the available operatives. Other situations may occur where only a limited group of operatives have authority to work at a particular site, e.g. because of a customer's security procedures. In yet other cases a specific individual operative may be requested for a particular job, for example because it is a follow-up to an earlier job performed by that individual, or as part of the individual's training. In order to accommodate this the cost values for all incompatible resource/job combinations may be arranged to be reset to infinity. However, if the operating system on which the system is being run has difficulty in handling infinities, a finite number may be used which is nevertheless sufficiently large that no such incompatible allocation will be made. This will nevertheless ensure that the allocation will be made to a compatible resource. In this specification, the phrase 'substantially infinite' is used to mean any number whose value is large enough to achieve this.

In order to reduce processing time, the system may operate on combinations only of those resources projected to become available in the near future (including any currently available) and those jobs having the highest priority.

In a further development of the invention, there is provided an apparatus for allocating a plurality of resources to a plurality of jobs comprising:

means for storing parameters relating to the resources;

means for storing parameters relating to the jobs;

means for determining from the parameters the time at which each resource is forecast to become available;

means for determining from the parameters the time at which each job is required to be performed;

means for assigning to each job a cost function which is calculated as a function of the time at which the job will be performed;

means for determining, for each possible combination of jobs with resources, the projected cost, dependent on the time at which each resource is forecast to be available and the value of the cost function for the respective job at that time;

means for determining the combination which produces the smallest total projected cost;

in combination with a network on which the jobs are to be performed, said network including means for detecting faults in the network, and means for supplying, to said means for storing parameters relating to the jobs, parameters of jobs to be performed to rectify the faults so detected.

Where the network is a telecommunications network, said fault detecting means may be a fault management system forming part of the network. The means for supplying parameters to the jobs may be simply an interface between the fault management system and said apparatus.

The parameters may include an assessment of the priority of the job to the performed, made wholly or in part on the basis of the availability of spare capacity in the network. In particular, if there is no spare capacity, such that service is interrupted, the job is allocated the highest priority.

BRIEF DESCRIPTION OF THE DRAWINGS

An embodiment of the invention will now be described, by way of example only, with reference to the accompanying drawings, in which:

FIGS. 16 and 17 are representations of cost score matrixes for the situation illustrated in FIG. 1.

FIG. 18 is a functional block diagram of the resource allocation system shown in FIG. 1.

DETAILED DESCRIPTION OF EXEMPLARY EMBODIMENTS

Figure 1:
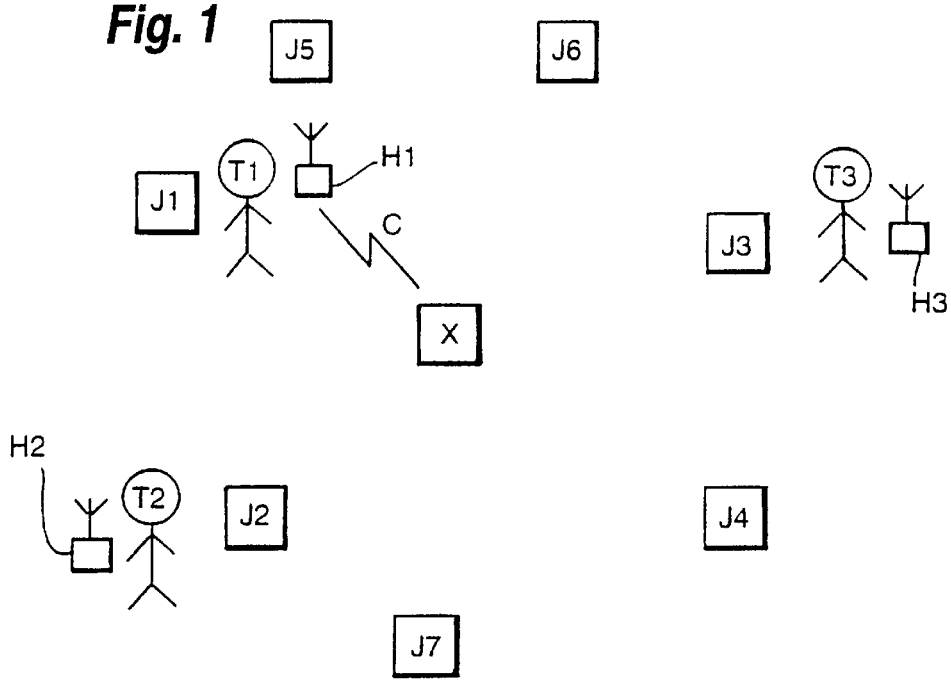
FIG. 1 shows a general arrangement of a system including a computer configured to operate according to the invention.

Referring to FIG. 1, there is shown a resource allocation system comprising an apparatus in the form of a computer X for allocating resources to jobs and three hand held terminals H1, H2, H3. Each of the hand held terminals may be a Husky model FS/2 produced by Husky Computers Ltd of Coventry, England. Each of the hand held terminals may be connected to the computer X by a fixed or mobile telecommunications network. FIG. 1 shows a link C made by such a network between terminal H1 and the computer X.

In the present example, the resources take the form of three technicians T1, T2, T3 who are provided, respectively, with the terminals H1, H2, H3. The three technicians are presently engaged on jobs J1, J2, J3 and there are four further jobs J4, J5, J6, J7 awaiting attention. In a real situation there will be many more technicians and jobs. The technicians T1, T2, T3 can use their terminals H1, H2, H3 for reporting completion of a job and for certain special purpose to be described later. They also use the terminals to receive instructions for the next job from the computer X.

In the present example, the three technicians T1, T2, T3 are part of a field force for performing jobs on a telecommunications work.

Figure 19:
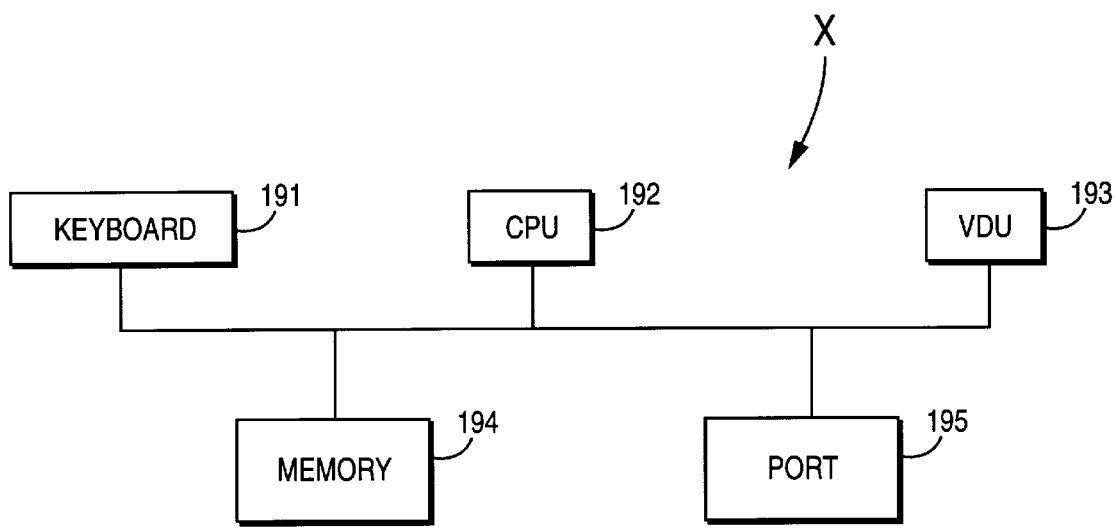
FIG. 19 shows the components of the computer of FIG. 1.

The components of computer X are shown in FIG. 19. These comprise a keyboard 191, a central processing unit (CPU) 192, a visual display unit (VDU) 193, a memory 194 and an input/output port 195. The data and the programs for controlling the computer X are stored in memory 194. The input/output port 195 connects the computer to the telecommunications system which provides the communication links between the computer X and the hand held terminals H1, H2, H3. The computer X can also review alarms from a fault monitoring system associated with the telecommunications network.

The computer X is provided with a main program for allocating the technicians to the jobs. The main program is divided into a set of routines. The general structures of the program the individual routine and the method used by the program for allocating the technicians to the jobs are discussed in detail below.

In FIG. 1, technician T1 has completed job J1 and contacts the computer X with the aid of his terminal H1 and the communication link c for instructions for his next job.

The problem is to determine which of jobs J4, J5, J6, J7 technician T1 should be instructed to perform next. The method used by the main program of computer X takes into account.

whether the technician can perform each individual job;
the time the technician would take to travel to the location of each job;
the time the technician would take to perform each job.
the relevant importance of each job, determined for example by the number of customers affected or the agreed maximum response time; and
the availability of the other technicians T2, T3.

The availability of these technicians depends on the time when they each will become available, which in turn depends on the length of the current job, the time the technician started doing it, and the rate at which he works.

The time that a job will take is subject to some uncertainty, since in many cases jobs involve the investigation and rectification of a reported problem. Until the problem is investigated the time it will take to rectify can only be estimated with a fairly large margin of error.

There are also other variable factors, such as the local circumstances of each job which makes a precise measure difficult. The method used by the main program of computer X calculates an estimated time window of job completion for all technicians currently engaged on a job, and updates this if a technician reports job completion early or fails to report at the estimated time.

The method first calculates a time dependant "cost function" for each job. This takes into account the penalty for failing to meet an agreed time. The penalty may be a real monetary cost if compensation is payable to a customer for failures to meet a time, or a 'virtual' cost—e.g. damage to a company's reputation. The penalty is a time-dependant property. In the simplest case the function is zero if the agreed time is met and a fixed value otherwise. In more complex cases, for example where compensation is payable according to the degree of lateness, it may be some more complex time-dependant function.

For each possible allocation of a technician to a job, a "technician/job cost", the cost of allocating a given job to a given technician is then estimated. This takes into account the cost of the job failing (which is the same whoever does it) and the probability of the job failing (which varies from one technician to another). This probability depends principally on the projected finishing time of the technicians current job, the amount of travelling time needed to get to the new job, the time by which the new job must be done, the estimated duration of the new job, and the variability of these factors. A projected cost is calculated by determining the projected time at which the technician will be available, and determining the value of the cost function for that job at that time.

Other factors, such as the ability of the technician to perform the job (taking into account skills, equipment, and security clearances available to each individual), and the amount of non productive time involved in that technician involved in carrying out that job (e.g. time spent in travelling, or waiting at the location for access if a "not before" appointment time has been made) can also be taken into account. It should be recognised that these costs are estimates and include a weighting for probability: in other words, they are actuarial costs. In many cases, the cost of allocating the job can in reality only be one of two values, zero or the failure cost. The actuarial or weighted cost lies between these values, its precise value depending on the probability of failure.

These various factors need to be reduced to a common unit of measurement. For example, all the factors may be measured in equivalent units of travel time. The cost of allowing a job to fail to meet its target time can be calculated as equivalent to the amount of travelling time one is prepared to use in sending a technician to prevent that failure occurring.

The method then determines the combination of the technicians and jobs for which the total of the "technician/job cost" values is a minimum.

The calculation is described in more detail below. Each combination of the technicians and the jobs will have a different total cost as evident from FIG. 16 and the combination with the lowest cost is selected as the allocation plan. The cost of not allocating each job must also be considered, and this is done by including one or more non-existent, "dummy" technicians. Other things being equal, the lowest priority job would be allocated to the dummy. For example technician T1 may be allocated job J5, technician T2 job J7 and technician T3 job J6, job J4 not being allocated at this stage. Technician T1 is then instructed by the communications link c to perform job J5. However, technicians T2 and T3 are not given any instructions at this stage as they have not yet completed their current jobs. The allocation of jobs J6 and J7 to technicians T2 and T3 are provisional, and may be changed for example if a further job (not shown), of higher priority than either job J6 or J7 is requested, or if a technician (e.g. T3) reports completion of a job unexpectedly early/or fails to complete a job at the predicted time. In this latter circumstance the jobs J4, J6 and J7 may be reallocated (again provisionally) to ensure the highest priority jobs are still done in time. FIG. 17 shows such a revised matrix. It will be seen that the allocations are now different. Also, job J5 has been replaced by new job J8 since J5 is now being carried out.

Figure 2:
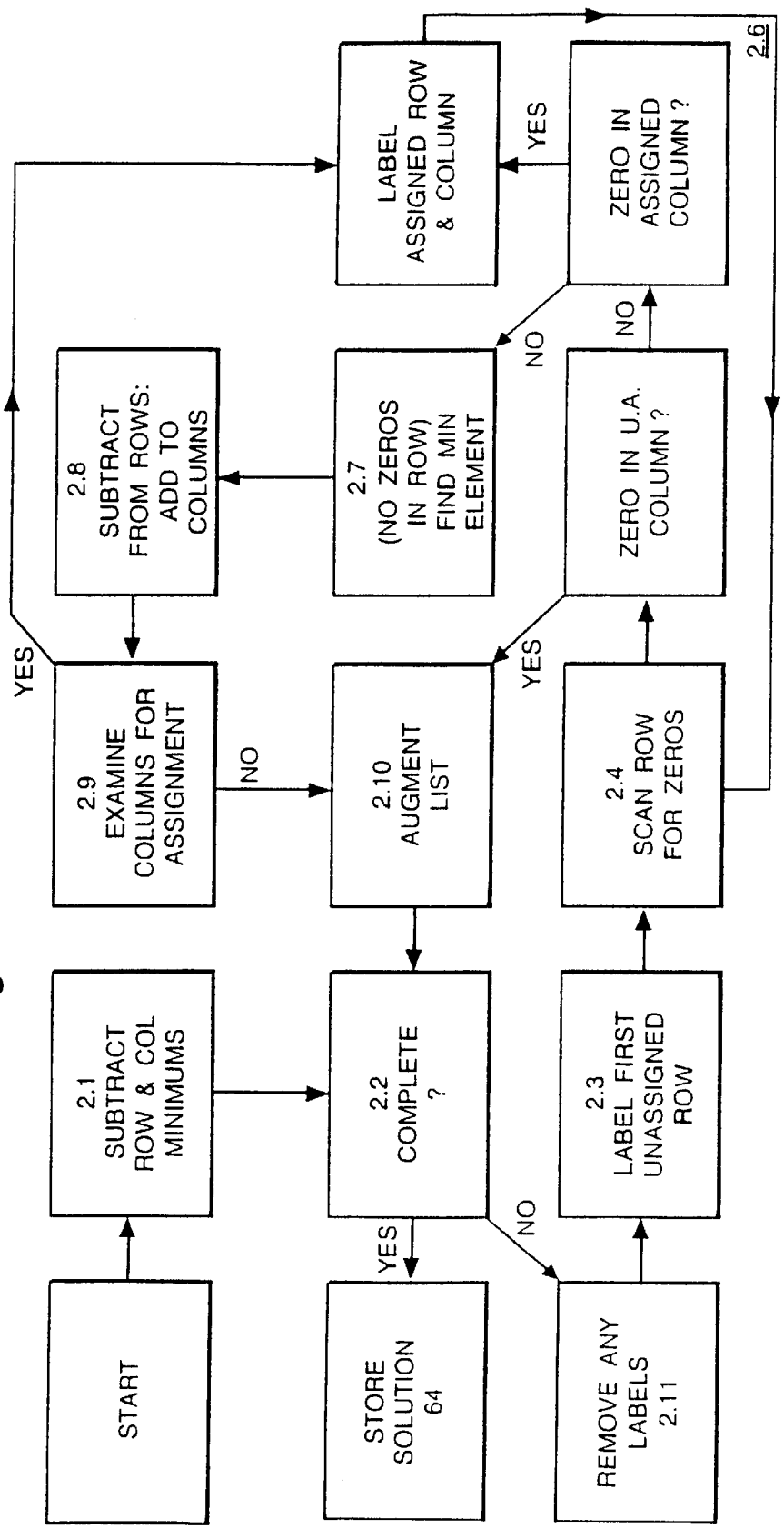
FIG. 2 is a flow chart showing diagrammatically the operation of a minimum cost calculation routine (the "Hungarian algorithm"—Wright variant) forming part of the main program of the computer of the system of FIG. 1.

The procedure carried out in the method to be described below involves a large number of steps. In order to assist in understanding the relationships of the flow charts of FIGS. 2 and 4 to 15, FIG. 3 shows the inter-relationships of these elements of the complete procedure. The basic allocation algorithm will now be briefly described with reference to the flow chart of FIG. 2. This procedure is described in more detail by H W Kuhn in Naval Research Logistics Quarterly vol 2, pages 83 to 97 (1955: "The Hungarian Method for the Assignment Problem") and M B Wright in "Speeding Up the Hungarian Algorithm": Computer Operations Research Vol 17 page 95-96 (1990).

Initially a square matrix (in the example below a 4×4 matrix) is prepared giving the various cost scores for allocating each resource to each job in the matrix. Each row and each column may be given an attribute referred to as a 'label'. This label identifies whether a row or column has been inspected for selection of an element in the optimum assignment, and whether such a selection has been made. The following steps are then performed:

Step 2.1 Subtract the row minimum value from each row and the column minimum from each column. This will leave one zero in each row and column. If some row or column is all infinite then the matrix is infeasible.

Step 2.2 Select as many independent zeros as possible i.e. zeros which do not share a row or a column with another selected zero. If two zeroes share a row or column only one of them may be selected. It is possible, though unlikely, that we will now have a complete assignment (see step 2.11 below)

Step 2.3 If the assignment is not complete, pick an unassigned row, and label it. If there is no such row go to step 2.7.

Step 2.4 Find a row which has been labelled but not yet examined. Mark it as examined and scan it for zeros.

Step 2.5 If a zero is found in an unassigned column go to step 2.10.

If a zero is found in an assigned column, label the column with the row number of the zero and label the row in which the previous assignment occurred. This label extends the chain which we will eventually follow backwards in extending the allocation set (step 2.10). If no zero is found, go to step 2.7.

Step 2.6 When we have finished scanning the row, go to step 2.4.

Step 2.7 Examine all the labelled rows and find the minimum element which is not in a labelled column. This value is necessarily non-zero since if it were zero the column in which it occurs would have been labelled by step 2.5. If there is no labelled row or if the minimum value that we find is infinite, the matrix is infeasible.

Step 2.8 Subtract this minimum value from each labelled row and add it to each labelled column. This will introduce a new zero in each column that contained that minimum value but will not disturb any zeros that we might want in augmenting the allocation set.

Step 2.9 Examine each unlabelled column for zeros in labelled rows. There is certain to be one since the minimum value that we subtracted/added was derived only from labelled rows; and zeros in unlabelled rows are of no interest since they cannot form part of an augmenting path. If the column has no assignment we can use this zero as one end of an assignment chain, so go to step 2.10. Otherwise label the column and row as in step 2.5 and go to step 2.4.

Step 2.10 Augment the allocation list by assigning this element and tracing back, following column labels and row assignments, until we come to the first row we labelled. As the trace is followed back, allocate each element identified by a column label and unallocate any previously assigned element in the same row. The net result is a gain of one assignment.

Step 2.11 if the solution is not complete remove all the row and column labels and go back to step 2.3.

Worked Examples

1. No Iteration

The following matrix produces a complete solution on the first iteration of step 2.2. The main body of the interactive loop is not entered at all. The solution is marked by a '*'.

| | row_pos | | | | | | | |
|---|---|---|---|---|---|---|---|---|
| | col_min | | | | | | | |
| | select | 3 | 2 | 1 | 4 | | | |
| | label | | | | | | | |
| | subtract | 0 | | 0 | 1 | | | |
| select | label | subtract | Original matrix | | | | Adjusted matrix | |
| 3 | | 2 | 15 | 10 | 2* | 9 | 13 | 8 | 0* | 6 |
| 2 | | 3 | 15 | 3* | 12 | 8 | 12 | 0* | 9 | 4 |
| 1 | | 0 | 0* | 17 | 0 | 2 | 0* | 17 | 0 | 1 |
| 4 | | 4 | 8 | 4 | 14 | 5* | 4 | 0 | 10 | 0* |

2. One iteration

This matrix assigns three out of the four rows in step 2.2. The partial solution is shown with a '*'.

| | row_pos | | | | | | | |
|---|---|---|---|---|---|---|---|---|
| | col_min | | | | | | | |
| | select | 3 | 1 | | 4 | | | |
| | label | | | | | | | |
| | subtract | 1 | 0 | 7 | 0 | | | |
| select | label | subtract | Original matrix | | | | Adjusted matrix | |
| 2 | | 12 | 17 | 12 | 19 | 16 | 4 | 0* | 0 | 4 |
| | | 6 | 16 | 6 | 16 | 9 | 9 | 0 | 3 | 3 |
| 1 | | 0 | 1* | 9 | 16 | 0 | 0* | 9 | 9 | 0 |
| 4 | | 1 | 8 | 18 | 17 | 1* | 6 | 17 | 9 | 0* |

We now label the first unassigned row (i.e. row 2) with a large number, in this case 99, and enter the main loop. As each labelled row is scanned its label is negatived to indicate that the row has been scanned. The labelling process also labels row 1 and column 2.

In examining element [2, 1] we set col_min for column 1. In examining element [2, 2], a zero, we label column 2 and, since element [1, 2] was initially selected, we label row 1. Examining elements [2, 3] and [2, 4] leads to setting 'row_pos [3]', 'row_pos [4]', 'col_min [3]' and 'col_min [4]'.

Row 1 is now scanned, because the previous iteration has caused it to be labelled.

| row_pos | 2 | | 2 | 2 | | | | |
|---|---|---|---|---|---|---|---|---|
| col_min | 9 | | 3 | 3 | | | | |
| select | 3 | 1 | | 4 | | | | |
| label | | 2 | | | | | | |
| subtract | 1 | 0 | 7 | 0 | | | | |
| select | label | subtract | Original matrix | | | | Adjusted matrix | |
| 2 | −2 | 12 | 17 | 12* | 19 | 16 | 4 | 0* | 0 | 4 |
| | −99 | 6 | 16 | 6 | 16 | 9 | 9 | 0 | 3 | 3 |
| 1 | | 0 | 1* | 9 | 16 | 0 | 0* | 9 | 9 | 0 |
| 4 | | 1 | 8 | 18 | 17 | 1* | 6 | 17 | 9 | 0* |

Scanning row 1 we update col_min and row_pos for column 1. Column 2 is already labelled and so is not processed. Column 3 is a zero and the column is neither labelled nor selected. This is a spare zero (i. e. not currently assigned) so we can update the chain by going to step 2.10.

| row_pos | 1 | 2 | 2 | | | | | |
|---|---|---|---|---|---|---|---|---|
| col_min | 4 | 3 | 3 | | | | | |
| select | 3 | 2 | 1 | 4 | | | | |
| label | | 2 | | | | | | |
| subtract | 1 | 0 | 7 | 0 | | | | |
| select | label | subtract | Original matrix | | | | Adjusted matrix | |
| 3 | −2 | 12 | 17 | 12 | 19* | 16 | 4 | 0 | 0* | 4 |
| 2 | −99 | 6 | 16 | 6* | 16 | 9 | 9 | 0* | 3 | 3 |
| 1 | | 0 | 1* | 9 | 16 | 0 | 0* | 9 | 9 | 0 |
| 4 | | 1 | 8 | 18 | 17 | 1* | 6 | 17 | 9 | 0* |

We now have a complete solution.

3. Two iterations, multiple solutions

This matrix has three minimal solutions. It also takes two iterations of the main loop. After step 2.2 this is how it looks.

| row_pos | | | | | | | | |
|---|---|---|---|---|---|---|---|---|
| col_min | | | | | | | | |
| select | 4 | 1 | | | | | | |
| label | | | | | | | | |
| subtract | 1 | 0 | 2 | 1 | | | | |
| select | label | subtract | Original matrix | | | | Adjusted matrix | |
| 2 | | 4 | 8 | 4* | 7 | 7 | 3 | 0* | 1 | 2 |
| | | 3 | 5 | 3 | 8 | 7 | 1 | 0 | 3 | 3 |
| | | 3 | 6 | 3 | 8 | 5 | 2 | 0 | 3 | 1 |
| 1 | | 2 | 3* | 2 | 4 | 3 | 0* | 0 | 0 | 0 |

* Solution

We now go through the main loop recording the information, as before. We start by labelling row 2, the first unassigned row. The scan results also in the labelling of row 1. Rows 1 and 4 are not scanned.

| row_pos | 2 | 1 | 1 | | | | | |
|---|---|---|---|---|---|---|---|---|
| col_min | 1 | | 1 | 2 | | | | |
| select | 4 | 1 | | | | | | |
| label | | 2 | | | | | | |
| subtract | 1 | 0 | 2 | 1 | | | | |
| select | label | subtract | Original matrix | | | | Adjusted matrix | |
| 3 | −2 | 4 | 8 | 4* | 7 | 7 | 3 | 0* | 1 | 2 |
| 2 | −99 | 3 | 5 | 3 | 8 | 7 | 1 | 0 | 3 | 3 |
| | | 3 | 6 | 3 | 8 | 5 | 2 | 0 | 3 | 1 |
| | | 2 | 3* | 2 | 4 | 3 | 0* | 0 | 0 | 0 |

Since we did not discover a spare zero we drop out of the loop at step 2.7. The minimum elements of the labelled rows and unlabelled columns are elements (1, 3) and (2,1) which have a value of 1. Subtracting this value from labelled rows 1 and 2 and adding to labelled column 2 gives:

| row_pos | 2 | 1 | 1 | | |
|---|---|---|---|---|---|
| col_min | 1 | | 1 | 2 | |
| select | 4 | | 1 | | |
| label | | | 2 | | |
| subtract | 1 | −1 | 2 | 1 | |

| select | label | subtract | Original matrix | | | | Adjusted matrix | | | |
|---|---|---|---|---|---|---|---|---|---|---|
| 2 | −2 | 5 | 8 | 4* | 7 | 7 | 2 | 0* | 0 | 1 |
| | −99 | 4 | 5 | 3 | 8 | 7 | 0 | 0 | 2 | 2 |
| | | 3 | 6 | 3 | 8 | 5 | 2 | 1 | 3 | 1 |
| 1 | | 2 | 3* | 2 | 4 | 3 | 0* | 1 | 0 | 0 |

We have new zeros at [1, 3] and [2, 1] and lose the zeros at [3, 2] and [4, 2]. Step 2.9 updates the 'col_min [1]' and 'col_min [3]' to 0, labels columns 1 and 3 and row 4 and returns 3, a zero in a spare column. Step 2.10 updates the assignments to:

| row_pos | 2 | 1 | 1 | | |
|---|---|---|---|---|---|
| col_min | 0 | 0 | 2 | | |
| select | 4 | 2 | 1 | | |
| label | 2 | 2 | | 1 | |
| subtract | 1 | −1 | 2 | 1 | |

| select | label | subtract | Original matrix | | | | Adjusted matrix | | | |
|---|---|---|---|---|---|---|---|---|---|---|
| 3 | −2 | 5 | 8 | 4 | 7* | 7 | 2 | 0 | 0* | 1 |
| 2 | −99 | 4 | 5 | 3* | 8 | 7 | 0 | 0* | 2 | 2 |
| | | 3 | 6 | 3 | 8 | 5 | 2 | 1 | 3 | 1 |
| 1 | 4 | 2 | 3* | 2 | 4 | 3 | 0* | 1 | 0 | 0 |

We now go back to the top of the loop, reset the margin data and labels, label row 3 as the first unassigned row and update the margin data. This time we label nothing and do not end on a spare zero, there is none in row 3, so we have to call Step 2.8 which introduces a new zero at [3, 4].

| row_pos | 3 | 3 | 3 | 3 |
|---|---|---|---|---|
| col_min | 2 | 1 | 3 | 1 |
| select | 4 | 2 | 1 | |
| label | | | | |
| subtract | 1 | −1 | 2 | 1 |

| select | label | subtract | Original matrix | | | | Adjusted matrix | | | |
|---|---|---|---|---|---|---|---|---|---|---|
| 3 | | 5 | 8 | 4 | 7* | 7 | 3 | 0 | 0* | 1 |
| 2 | −99 | 4 | 5 | 3* | 8 | 7 | 0 | 0* | 2 | 2 |
| | | 4 | 6 | 3 | 8 | 5 | 1 | 0 | 2 | 0 |
| 1 | | 2 | 3* | 2 | 4 | 3 | 0* | 1 | 0 | 0 |

As we have an extra zero in element [3, 4] step 2.9 returns column 4. Step 2.10 assigns [3, 4] and the assignment is complete.

| row_pos | 3 | 3 | 3 | 3 |
|---|---|---|---|---|
| col_min | 1 | 0 | 2 | 0 |
| select | 4 | 2 | 1 | 3 |
| label | 4 | | | |
| subtract | 1 | −1 | 2 | 1 |

| select | label | subtract | Original matrix | | | | Adjusted matrix | | | |
|---|---|---|---|---|---|---|---|---|---|---|
| 3 | | 5 | 8 | 4 | 7* | 7 | 2 | 0 | 0* | 1 |
| 2 | | 4 | 5 | 3* | 8 | 7 | 0 | 0* | 2 | 2 |
| 4 | −99 | 4 | 6 | 3 | 8 | 5* | 1 | 0 | 2 | 0* |
| 1 | 1 | 2 | 3* | 2 | 4 | 3 | 0* | 1 | 0 | 0 |

A feature of the preferred embodiment of the invention is the use of 'dummy' technicians. Because the 'Hungarian' algorithm requires a square matrix the same number of technicians and jobs must be used. However, if only the correct number of jobs to match the number of real technicians is assessed, non-optimal solutions may occur. Assuming there are N technicians, then the N highest-priority jobs will be allocated. However, there may be a job (j (N+X)) whose priority is just outside the top 'N', whose inclusion instead of one of those within, but near the bottom, of the top 'N' (say j (N-z)) would provide a lower-cost solution.

In order to overcome this problem more jobs are put into the matrix than there are technicians. 'Dummy' technicians are included in order to make the matrix square again. In a practical embodiment, there may be several times as many jobs as technicians, to ensure the lowest-cost solution is always found.

The cost values assigned to jobs allocated to dummy technicians are selected according to the priority of the job. For example, a job which must be allocated within a short time is allocated a very high cost score with a dummy technician, such that any available real technician able to do the job will have a lower cost score and be allocated the job instead. Similarly, jobs of very low priority are allocated a zero cost score, which indicates that a technician should only be assigned to it if no other job can be assigned to him. Intermediate values are assigned for cases falling within these extremes. Essentially the cost score of allocating a dummy technician to a job is the cost of delaying that job, including the calculated risk that no real technician will become available in time to do it.

The very high cost-score referred to should be less than the substantially infinite value used for incompatible allocations of jobs to technicians, because an infinite value could result in a situation where the matrix is insoluble (because no real technician can do it either). In such a case the job would be counted as a failure and removed from the system, which would prevent a suitable real technician who completes his previous job ahead of time being given it.

In certain circumstances, particularly towards the end of a day, there may not be enough jobs to fill the matrix. The algorithm can be adjusted in such cases to work with differently-sized matrixes, but it is simpler to insert dummy jobs to make the number up again. The cost value of allocating a dummy job to a technician is the value of the idle time involved i.e, in units of travel time, how far it is deemed cost-effective to send the technician to do a real job instead. The cost value of allocating a dummy job to a dummy technician is zero.

The remainder of the method, to be described below, determines the initial values to be used in the method, and the steps for instructing the technicians about their assigned jobs.

Figure 3:
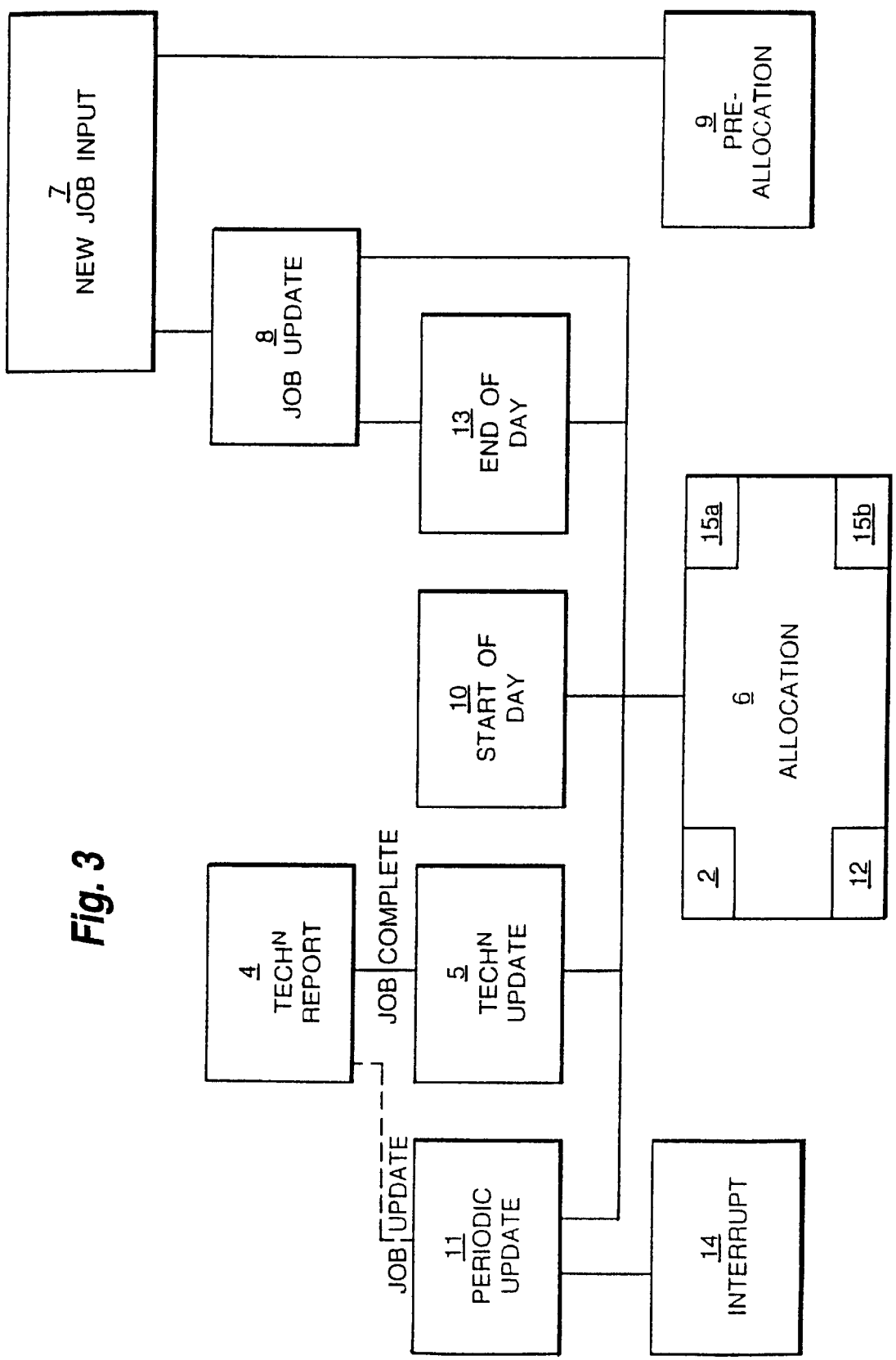
FIG. 3 is a general flow chart showing an over-view of the various routines which together form the main program of the computer, the individual routine being shown in greater detail in FIGS. 2 and 4 to 12.

FIG. 3 shows an overview of the various routines which form the main program of computer X. The reference numerals used for the individual routines also correspond to the numbers of the individual Figures showing the individual routines in more detail.

When a technician reports in, a routine 4 performs a number of preliminary checks to identify certain special cases. Should these checks not identify such a special case the program continues with a routine 5 to update the details of the technician in the database and to check whether the technician has already been allocated a job in a recent run of the program for which the conditions are still valid.

If the assumptions used in the earlier run are no longer valid, for example if the technician has reported in unexpectedly early, or if no job was allocated to the technician in the earlier run, the row in the cost matrix corresponding to that technician is amended, (routine 5), and the allocation of jobs to technicians then takes place (routine 6), ending with the technician being informed of his next job and his details again being updated.

If a technician reports in with a revised estimate of completion of his current job a routine 11 takes place to update the technicians details, to be used in the next updating run of the allocations routine 6.

A similar procedure is necessary when a new job is requested. In routine 7 the parameters of the job are collated. If the job is to be allocated to a specific technician the technician and job may be handled by a special routine 9, (to be discussed below) otherwise the job parameters are updated (routine 8) and the allocation routine 6 is performed.

At periodic intervals an update of the technician and job allocation procedure is also made. For the determination of initial values for the cost matrix there are two slightly different initial routines 10, 11 for the first run of the day and for subsequent runs respectively. In both cases the allocation routine 6 is then run.

An additional routine 12 may be employed as part of the allocation routine 6, to provisionally allocate each technicians second job. This is a safeguard in case the technician is unable to report the completion of the first job because of communications difficulties.

The following FIGS. 4 to 15b show the routines mentioned above with reference to FIG. 3 in greater detail. These routines are interlinked, and the numerals 4 to 15b in these figures identify the figure showing the continuation of the program.

Figure 4:
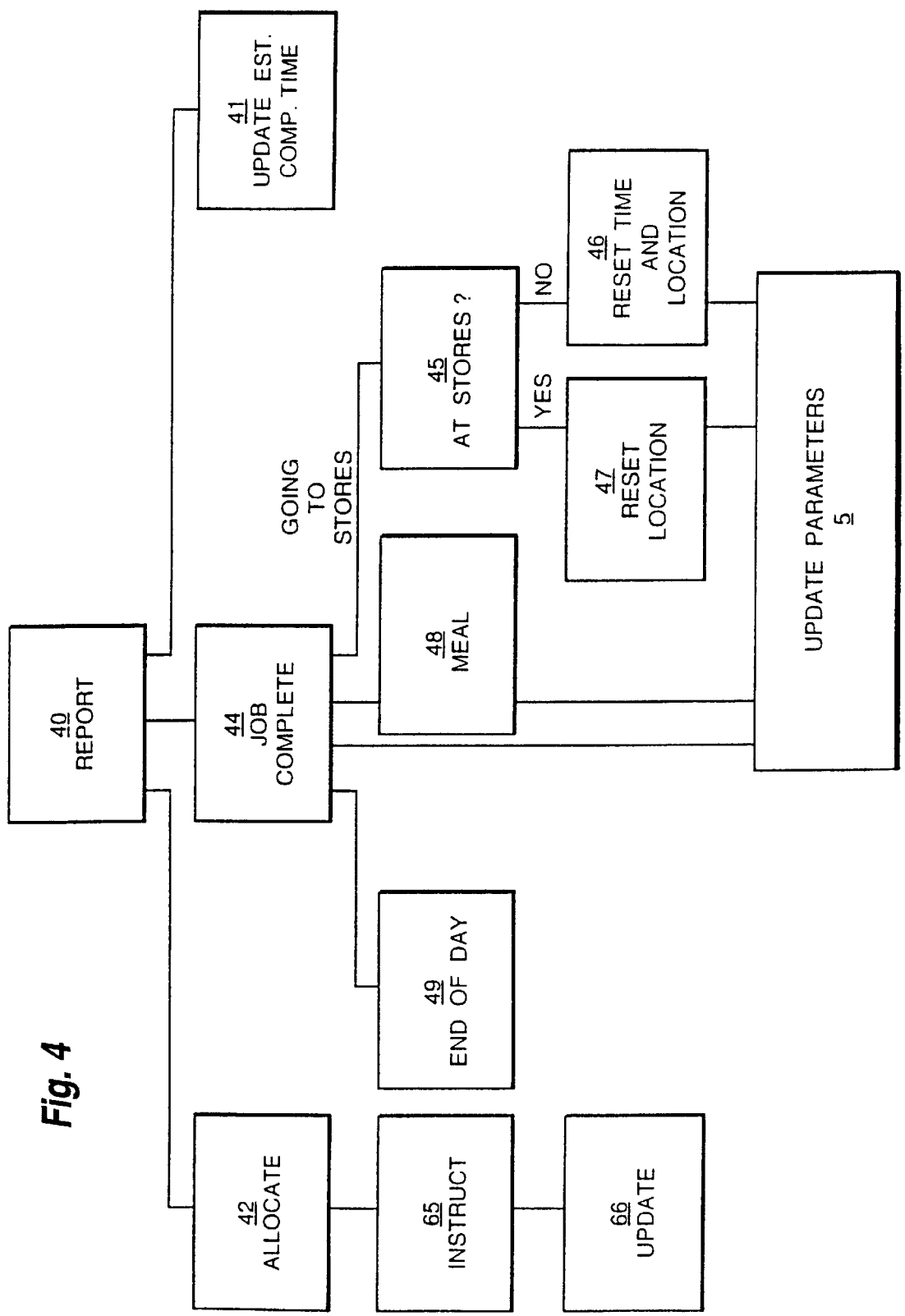
FIG. 4 is a flow chart showing the routine performed when a operative reports job completion.

In FIG. 4 there is shown the flow chart for routine 4. This routine comprises the preliminary steps which take place whenever a technician comes on line to report, for example at the start of a shift, or to report progress or completion of a job.

In step 40 original contact is made and in response to this, one of three courses is taken. If the technician is reporting at the start of the shift then a job will already have been allocated to him as part of the start of day procedure to be described below with reference to FIG. 10. This job is allocated to the technician in step 42 and a jump is then made to step 65 in which the technician is instructed, and details of the technician in the system are updated in step 66.

If the technician is not available for a job, but is instead reporting the progress on his current job (such as the need to visit stores for a spare part) this information is used to update the technician's estimated completion time (step 41) which is used in the next run of the updating routine 11.

If the technician is reporting completion of the currently allocated job, step 44 takes place to determine whether the technician is available for another job immediately or not. There are four possible outcomes.

If the time of day is within a predetermined threshold limit of the technician's end-of-shift time then no further job is allocated (step 49).

If the technician needs to collect equipment from a stores point, step 45 takes place, which determines whether the technician is already at the stores point or merely intends to go there. If the latter, the technician's estimated job completion time is reset to the present time plus the time calculated for him to travel from his present location to the stores, plus the time allowed at the stores (step 46). This effectively generates a new "completion time" at which the technician will be available to travel to a new job. If the technician is already at the stores point the job completion time is set to the present (step 47). In both cases the technician's location is updated to that of the store. The program then continues to update the technician's parameters in routine 5.

If the technician intends to take a meal break before starting the next job the job completion time is set to the present time plus the duration the technician is permitted for his meal break (step 48). If none of these special cases apply, the technician is simply awaiting his next job and the procedure goes straight to FIG. 5. In all the above cases the program then goes on to update the technician's parameters in routine 5.

Figure 5:
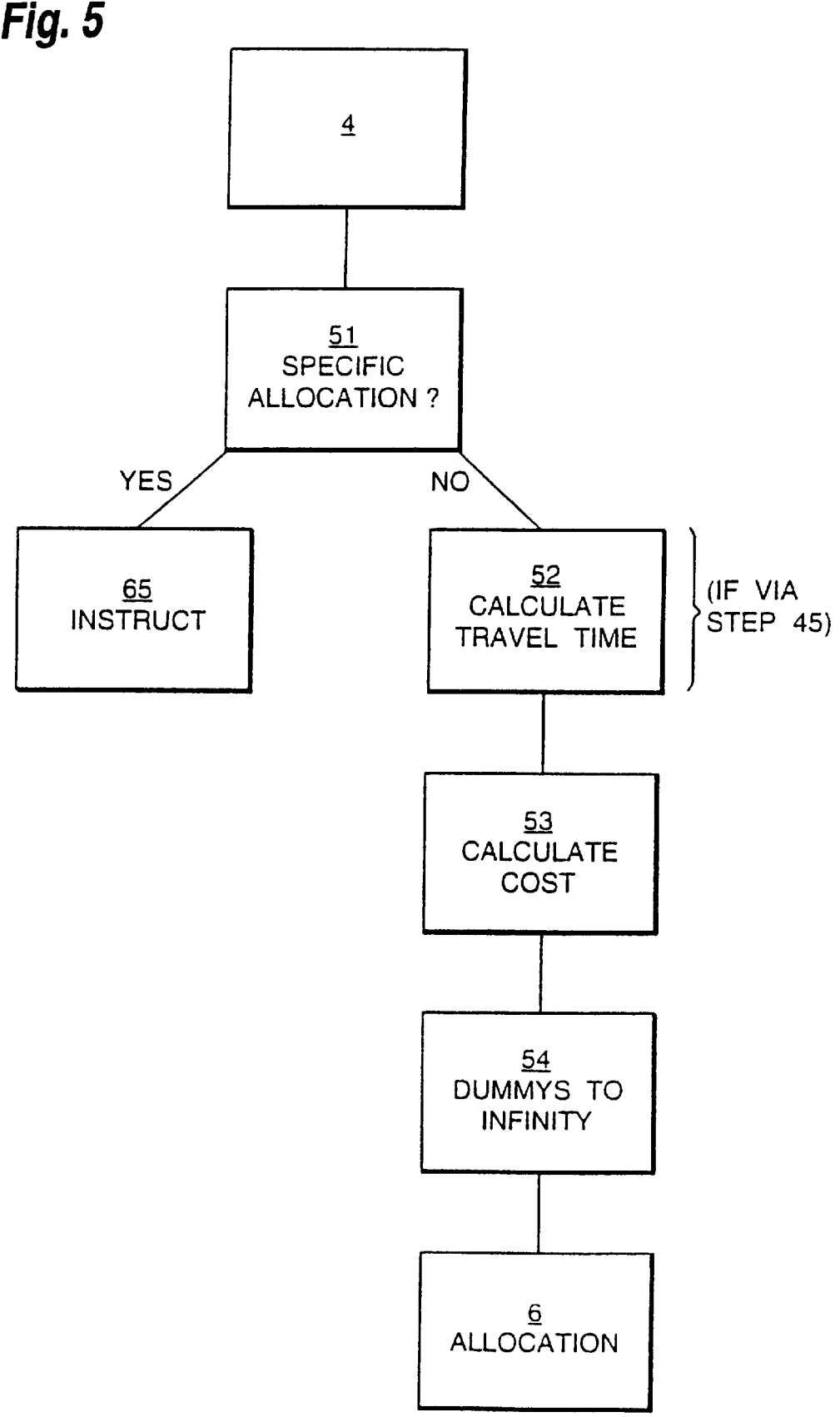
FIG. 5 shows the routine for updating the operatives' parameters in the system

FIG. 5 shows the flow chart for routine 5 for updating the technicians' parameters on the system when they report completion of a job.

If the pre-allocation procedure 9 to be described below is in use, the first step is to check (step 51) whether the technician has already been pre-allocated a job. If so a jump is made to step 43 and this job is sent as an instruction to the technician. Otherwise, if the technician is at, or intends to visit, a stores point (step 45 above), the travel time to each job from the stores point must be determined (step 52), since any calculation of travel time must be made from the stores point (as derived in step 46) and not the previous job location. The cost of job failure is then calculated for each job the technician can do (step 53). For any dummy jobs in the system this cost is set to infinity to avoid an on-line technician getting a dummy job (step 54).

Figure 6:
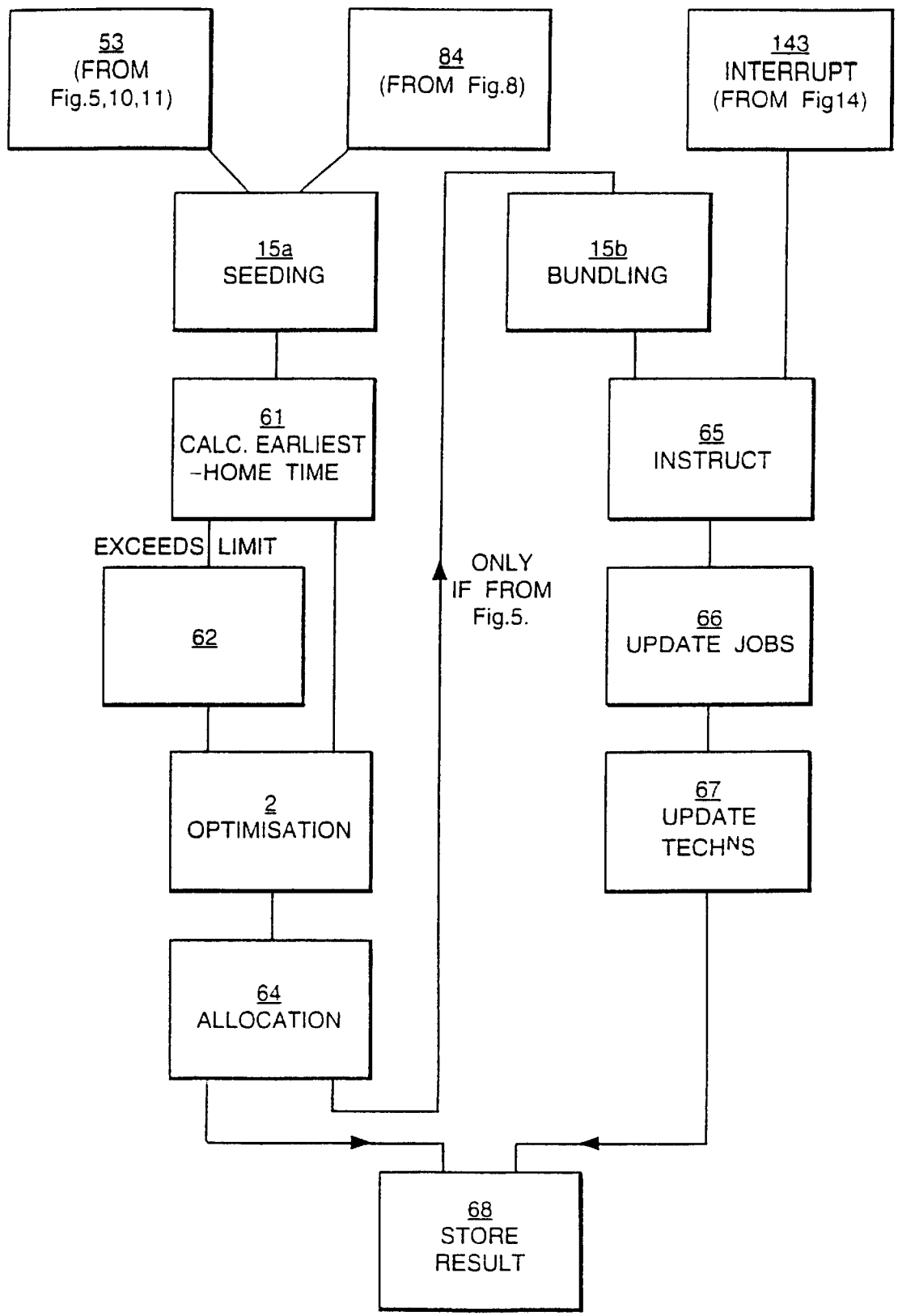
FIG. 6 is a flow chart showing the job allocation routine itself.

In FIG. 6 is shown the job allocation routine 6 which is a continuation common to all routines 5, 8, 10 and 11.

Figure 15A:
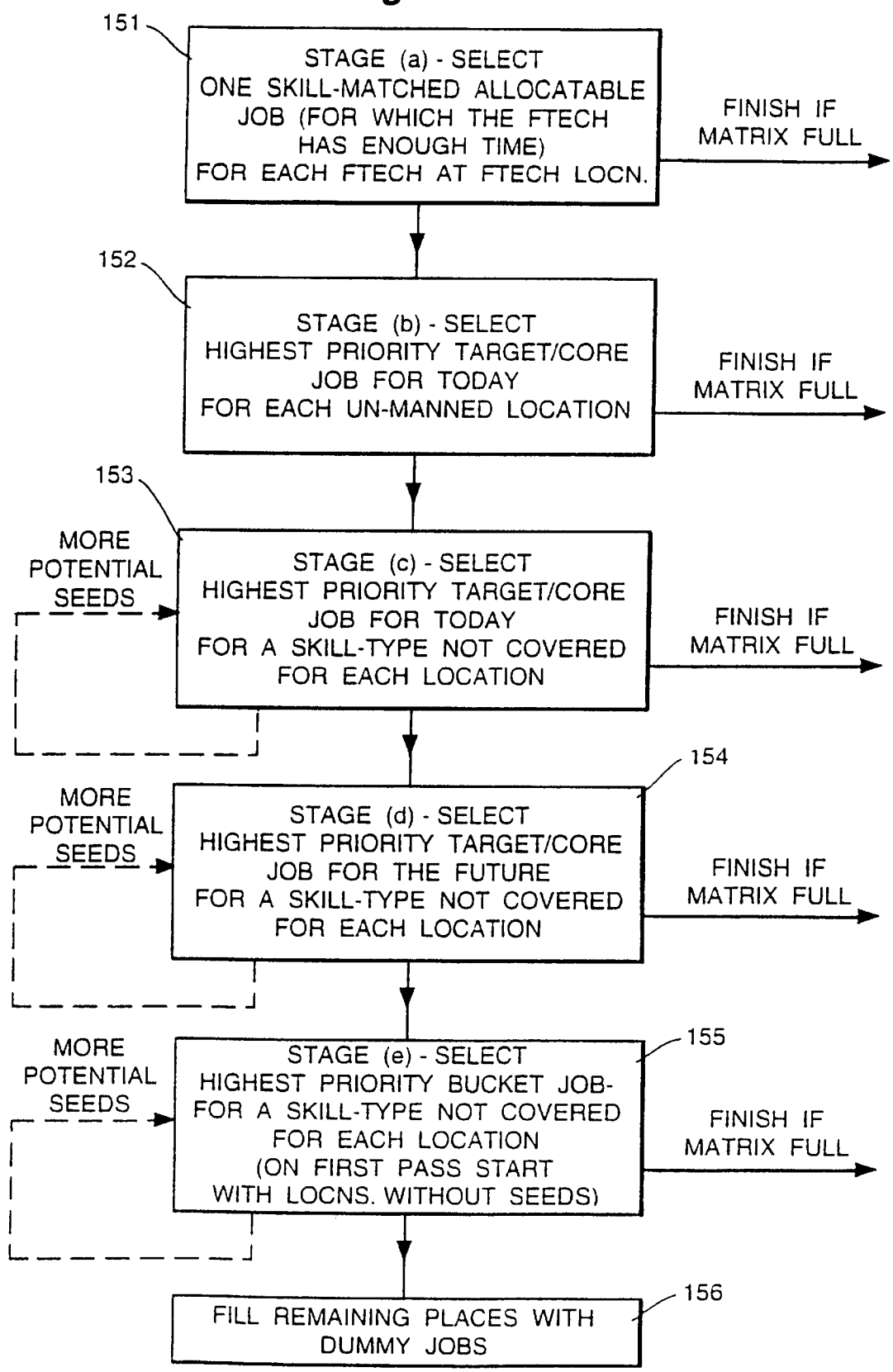
FIG. 15a shows a flow chart for a job-selection procedure.

If the work tends to be clustered at known locations, it is desirable to first perform a 'seeding' procedure (FIG. 15a). If there are several jobs at the same location, each one could otherwise be allocated a different technician, causing unnecessary travelling if one technician could perform several of them. Moreover, if a technician can be allocated two or more jobs at the same location, he may be able to work on both jobs in parallel more efficiently than in series. It is thus desirable to group jobs where possible. However, it is not practical to re-define all of these group as a single 'super job' as the different skills required to do all of the jobs, or the time needed to complete them, may be too restrictive on the number of technicians able to carry them out.

Figure 15B:
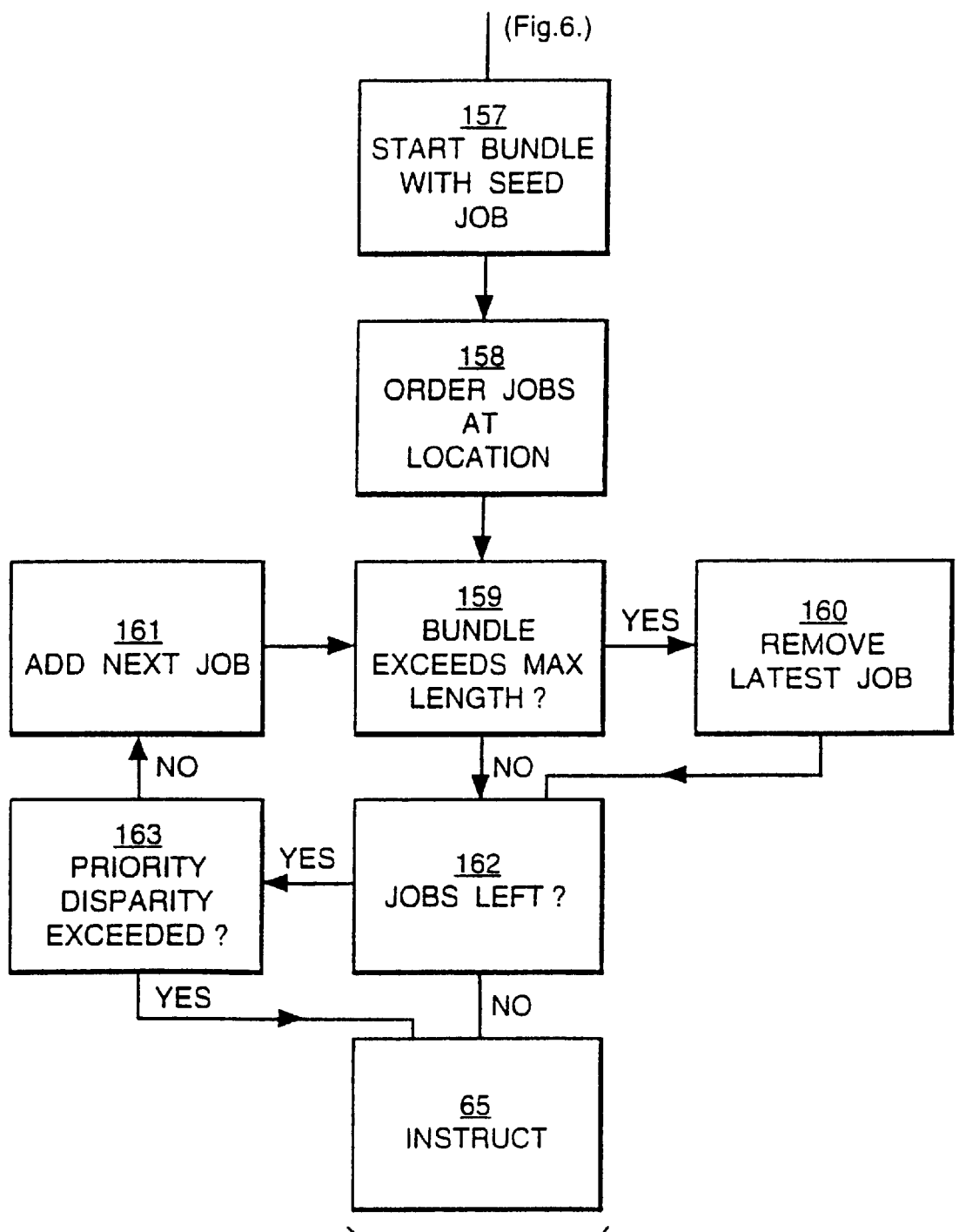
FIG. 15b shows a flow chart for a job-grouping procedure.

This problem can be alleviated by performing the procedure shown in FIGS. 15a and 15b. In this procedure a number of high-priority jobs are included in the current matrix, which act as 'seeds'. They are associated with other jobs, which may be of the same or different priority and may also appear in the matrix. When a job is allocated to a technician, only those of the associated job which are compatible with him are also allocated to him. They are also removed from the matrix if they are present within it. In this way, grouping of jobs can be achieved in a flexible manner.

In FIG. 15a is shown the procedure for selecting 'seed' jobs. This is an initial step in the allocation routine 6. In FIG.

15b is shown the procedure for instructing a technician to perform the group of jobs, which forms later part of the allocation routine 6.

In FIG. 15a, the matrix is filled with 'seed jobs'. These are jobs having appointments within a predetermined time in the future which are still achievable. They are selected in several stages so as to give every chance of a technician being able to stay put and also to give a good geographical and skill type distribution to seed-jobs to support multi-skilling and reduce travel. In this way it should avoid situations where many important jobs at a few locations would dominate the matrix—potentially forcing excess travel.

They are selected for entry in the cost score matrix in the following order:

a) The highest priority job at each technician's present location which is compatible with his skills (to allow them to be allocated a seed job which allows them to stay put). (Step 151).

b) High priority job at un-manned locations (Step 152)

c) Remaining high priority jobs at any location with a skill-type which is not already covered by a seed job (Step 153)

d) Important non-urgent jobs at any location with a skill-type which is not already covered by a seed job (Step 154)

e) Low importance work at any location with a skill-type which is not already covered by a seed job (needed for end-of-day or low work conditions). (Step 155).

This seed job identification process stops as soon as enough seed jobs have been identified to fill the matrix. All remaining stages are skipped.

The seed jobs appear in the matrix in real-time priority order.

By selecting this ordering for selecting jobs for the cost-score matrix it is ensured that a) if there is another job to be done at a technician's present location, it is considered (even if it is of low priority)

b) all locations with high-priority jobs are considered c) high-priority jobs at the same location but requiring different skills are all covered.

The number of technicians (including dummies) and jobs is compared, and if there are not enough jobs the imbalance is made up with 'dummy' jobs (step 156). Allocations of dummy jobs to technicians are allocated a high but non-infinite cost to encourage the allocation of real jobs where possible. However, to avoid a technician actually being instructed to perform a dummy job, a technician currently awaiting a job is allocated an infinite cost score for any dummy job in the system (step 54). This ensures that the lowest-cost combination will not be one in which a dummy job is allocated that technician.

Next, for each combination of job and technician the technicians "earliest home time" is calculated in step 61, and a calculation is made as to whether this is within a threshold limit of the technician's end of the shift. If it is, and the job is a category 'B' job (i.e. may be done tomorrow, as determined in Step 82 below) additional "end of day" preparations 62 are made to ensure that the technician is allocated an infinite cost score for that job. The next stage is the optimisation routine 2 described in greater detail with reference to FIG. 2 which determines the combination of technicians and jobs having the lowest cost score. A routine 12 to pre-allocate second jobs to technicians may also take place (see FIG. 12). If a technician is on line he is then instructed to do the job allocated to him in the optimum allocation routine (step 65). A 'bundling' procedure complementary to the 'seeding' described above with reference to FIG. 15a can form part of this procedure.

Firstly, the job selected by the algorithm 2 is entered into a "bundle" (Step 157). Secondly, all jobs (in the pool or in the matrix) located at the same place as the selected job and having skill requirements compatible with the technician are selected and prioritised (Step 158).

The total duration of jobs in the bundle (i.e. on the first iteration, the seed job only) is compared with a maximum bundle duration (selected to avoid a technicians being out of contact for too long and also taking into account the end of this duty hours). (Step 159). If this maximum is exceeded, the last job to enter the bundle is removed from the bundle again. (Step 160) (unless only the seed job is present). This process is repeated (Step 161) for each job in the priority order determined in Step 158, until there are none left (Step 162) or, (Step 163) a parameter is exceeded which is selected to avoid an excessive number of unsuccessful iterations (for example a predetermined number of jobs rejected in Step 160, or a large disparity between the priority of the first (seed) job rejected and the next to be considered).

The bundle of jobs is then sent as an instruction to the technician (Step 65). The job or jobs allocated to the technician are removed from the list of jobs awaiting assignment (Step 66) and the technician's own details (location, estimated job completion time) are updated. (Step 67).

Figure 7:
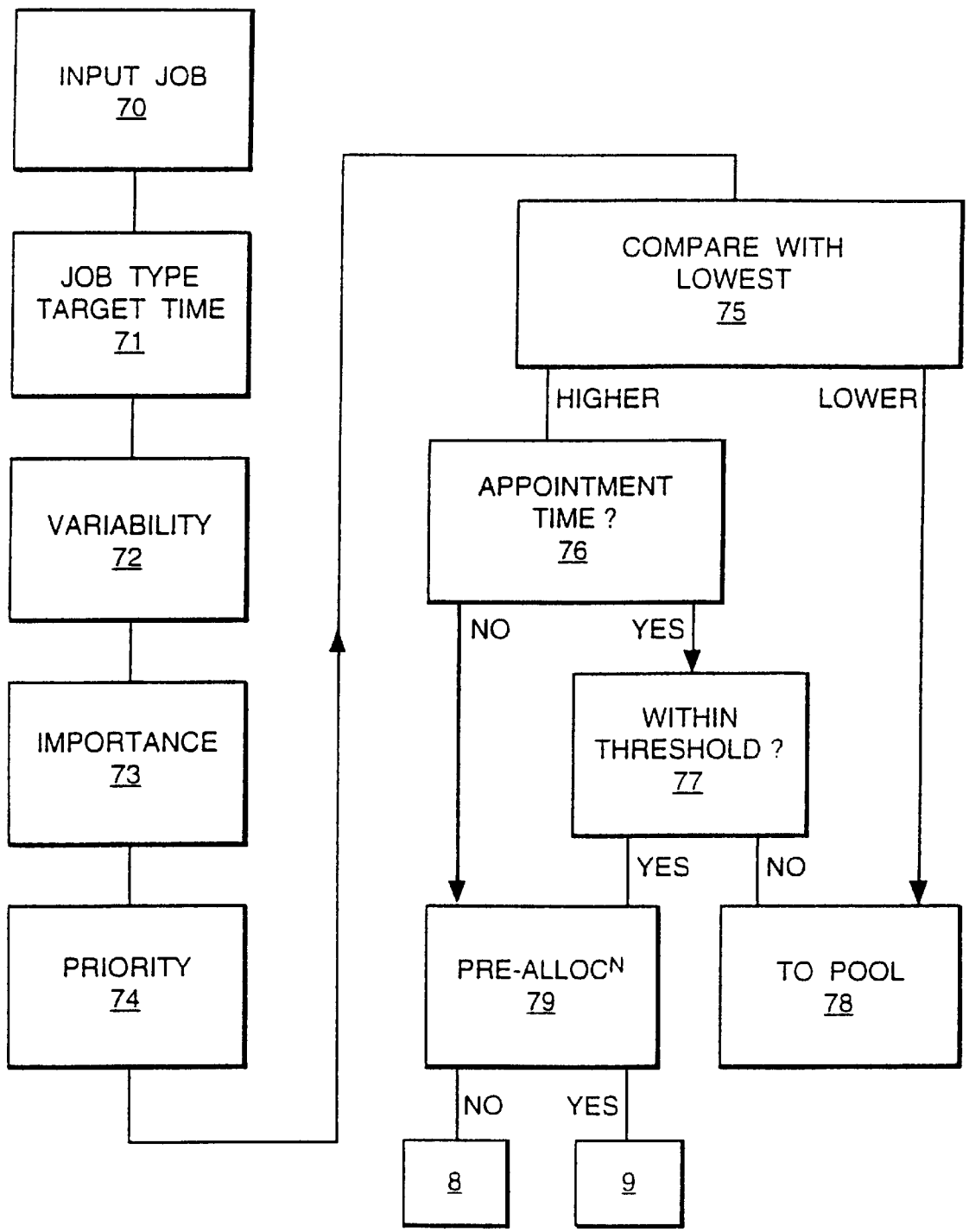
FIG. 7 shows the routine for updating job parameters when a new job is requested.

FIG. 7 is a flow chart for routine 7, which takes place when a new job request is added to the system. The job is input to the system (step 70) either manually or in response to an alarm generated by the fault monitoring system, and its type and target time (step 71), its variability (step 72) and its importance (step 73) are determined, based on criteria input manually or determined according to stored data relating to the importance, etc of the equipment to be repaired. Certain jobs which are difficult to allocate may be given increased weightings to ensure that they are considered earlier than they might otherwise have been. Such considerations would include very long jobs which must be allocated early in the day to ensure sufficient time for completion, or jobs which have to be performed before a certain time (eg jobs which must be done during daylight hours for safety reasons). On the basis of these values the priority of the job is determined (step 74) and this is compared with the priorities of the lowest priority job currently allocated (step 75). If it is of lower priority than this currently allocated job it is entered in the pool of unallocated jobs (step 78) but otherwise it is checked to see whether it has a definite appointment time 76, and if so whether the appointment time is within a threshold limit (step 77). If it is not within the threshold limit it is entered in the pool (step 78). If it is within the threshold it is checked as to whether the job is to be performed by a specific individual, in which case routine 9 is used. If the job can be performed by all, or a subset of the technicians routine 8 is followed.

Figure 8:
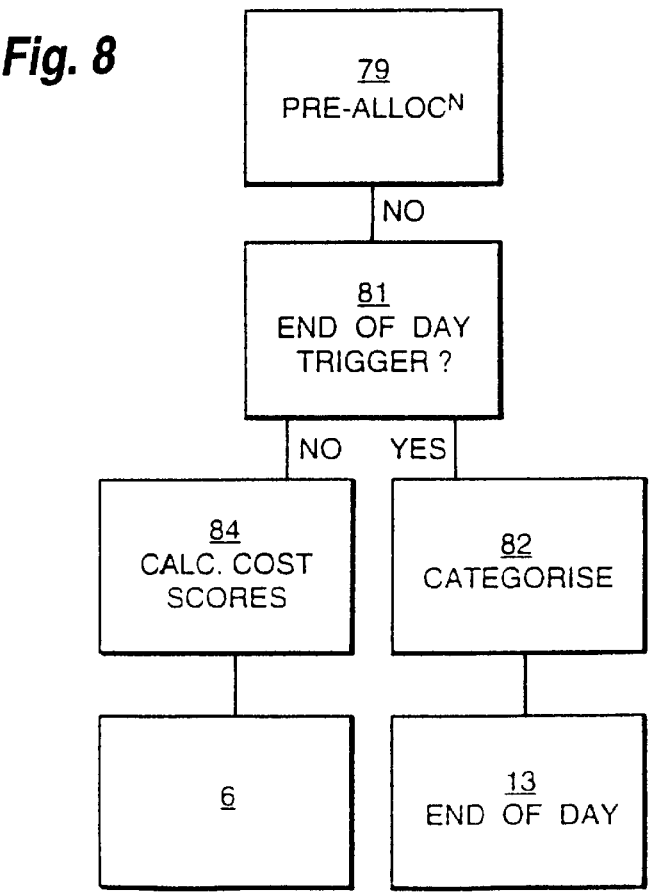
FIG. 8 shows a continuation of the job parameter update.

FIG. 8 shows the flow chart for routine 8 which is responsible for updating the allocations when a new job replaces the lowest priority job in the matrix. The first step, (step 81), is to determine whether an end-of-day trigger point has passed. If it has, then the jobs are characterised (step 82) as category A (must be done today incurring overtime if necessary and available) or category B (may be done tomorrow) and the end of day routine 13 described below (FIG. 13) is then followed. Category B jobs are not assigned to a technician if he would not complete it before his end of day time. Category A jobs continue to be assigned, incurring overtime if necessary, until there are none left. If the end of day trigger point has not passed, the routine calculates the time-dependant cost function for the new job (step 84) and the procedure then continues to allocate the jobs as shown in FIG. 6. Step 65 is however omitted since no technician is on line awaiting a job.

Figure 9:
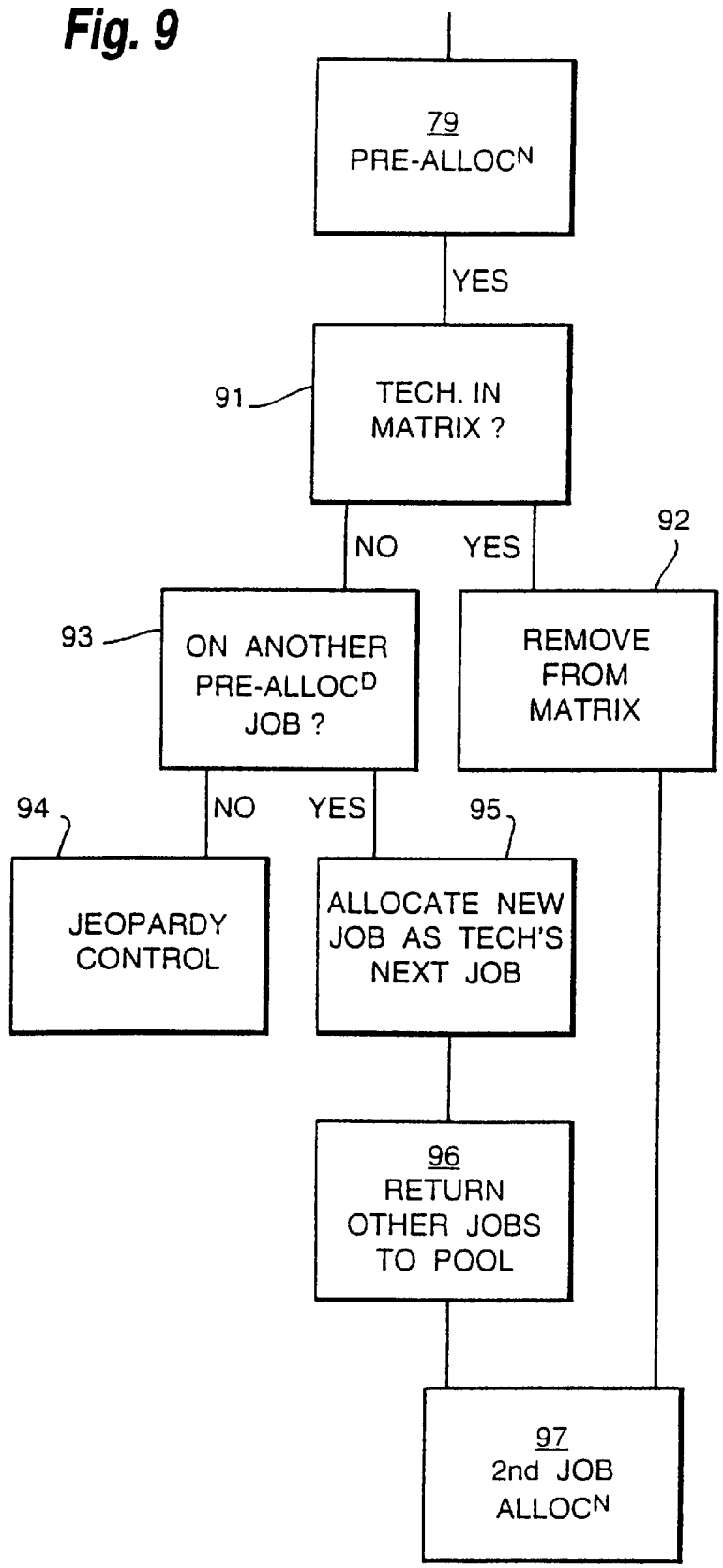
FIG. 9 shows a pre-allocation routine for those jobs which are identified as being required by a specific individual operative.

FIG. 9 shows a routine for use when the job is to be allocated to a specified technician. It is possible to simply allocate infinite cost scores for such jobs to all technicians except the specified one. However, in this variant such jobs and technicians are dealt with separately. This allows more jobs which are non-specific to a technician to be included in the matrix. The first step (step 91) is to determine if the technician is one of those currently in the allocation matrix. If he is, he is removed from the allocation matrix and allocated the new job instead (step 92). If he is not in the matrix the routine next determines (step 93) whether the technician has already been allocated such a job. If he has not, this implies that the job he is currently engaged on is expected to take longer than the current time window covered by the matrix. The situation is alerted to the system controller (step 94) as the job needs to be jeopardy managed. The jeopardy management procedure depends upon the nature of the jobs, but may involve returning the job to the pool for allocation to another technician, job cancellation, reporting job failure or instructing the technician to suspend his prevent job in order to do the pre-allocated one instead.

If an earlier pre-allocation has not so far been made, the technician is allocated to the highest priority job of those to be allocated specifically to him (step 95), and all other such jobs are returned to the pool (step 96). The technician allocated to a job specific to him by either of the above routes (step 92; or step 93, step 95, step 96) is allocated the next highest priority specific job as his second job (step 97) should one exist in the system. There is then a jump to step 66 to update the technician's details as described above with reference to FIG. 6.

Figure 10:
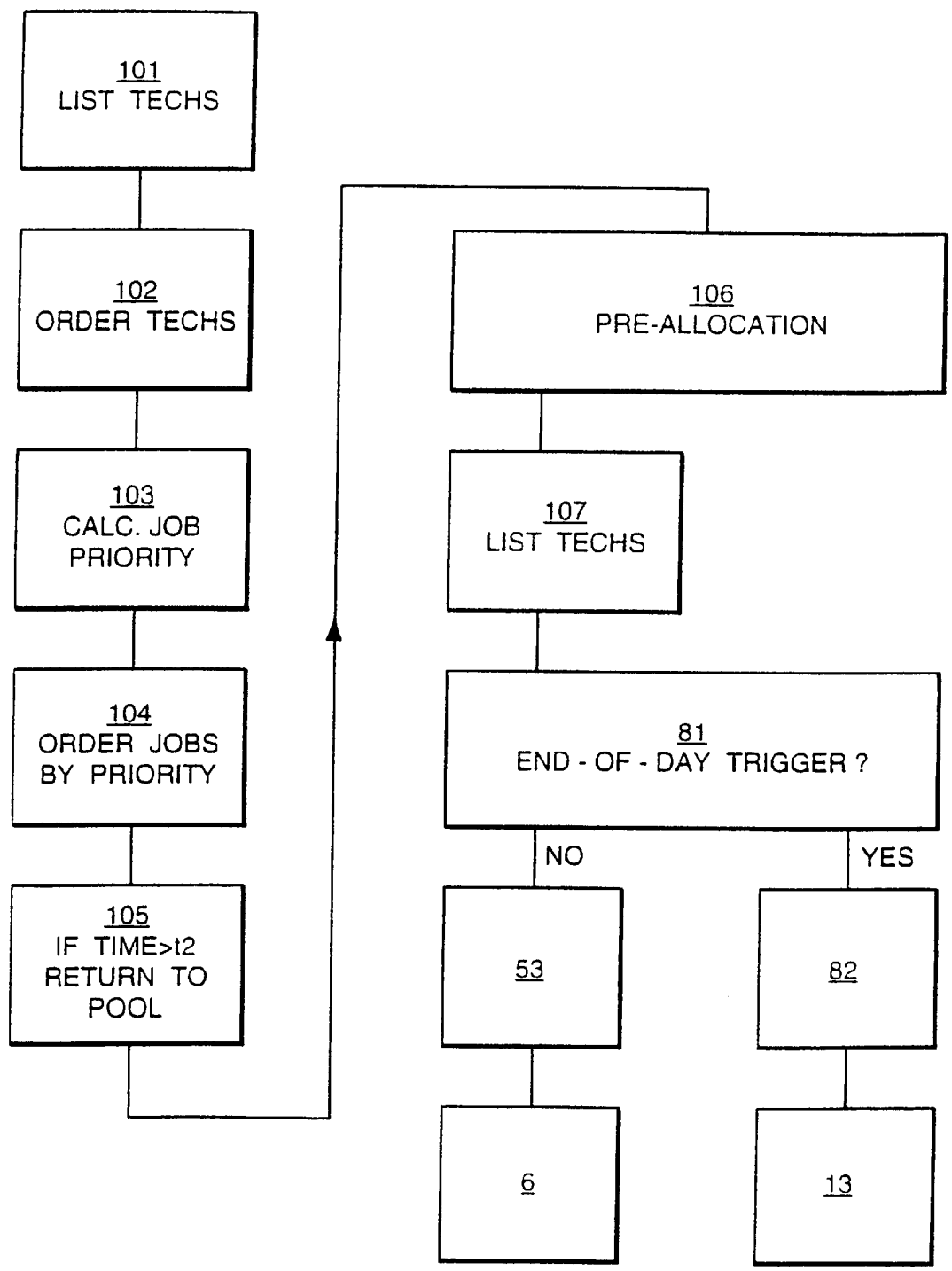
FIG. 10 shows a flow chart for the initialisation routine to be performed at the beginning of the working day.

The start-of-day routine (routine 10) is shown in FIG. 10. This comprises collating the information on the technicians scheduled for duty and the information on those jobs awaiting attention. These may be jobs outstanding from the previous day or new jobs which have been requested overnight.

Two lists are prepared. In steps 101, 102, 106, 107 a list of available technicians is prepared (left hand side of FIG. 10), whilst in step 103, 104, 105, 106, 108 a list of jobs requiring technicians is prepared (right hand side of FIG. 10).

In step 101 a list of available technicians is compiled and in step 102 these are ordered by their Start-of-Day times.

In step 103 each job in the pool has its priority value calculated and the jobs are then arranged in order of their priority value (step 104).

In step 105 jobs with appointment times are assessed. If the appointment time is later than a critical value t2 (the 'Global Start of Day time') the job is returned to the pool, to be allocated later.

Figure 14:
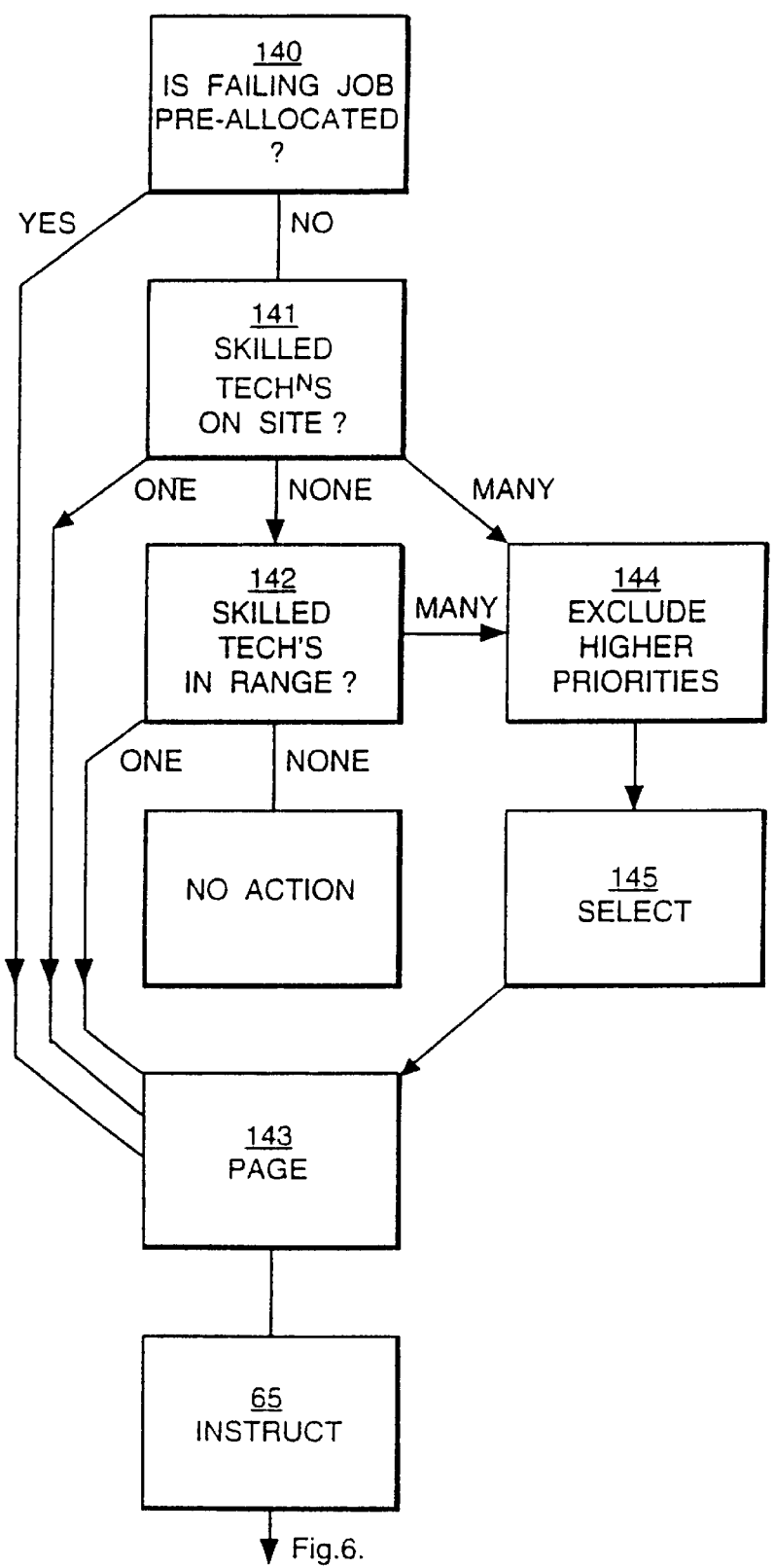
FIG. 14 shows a flow chart for a 'job-interrupt' procedure.

If high-priority jobs are failing this is identified in Step 115 and the 'interrupt' routine shown in FIG. 14 is entered.

All jobs which are technician-specific are then assessed in step 106. For each technician who has a technician-specific job, this job is allocated to the technician and he is removed from the list prepared in step 102. If a technician has more than one such job, the two with the highest priorities are allocated. The second will be provisional, as described in more detail below with reference to FIG. 12. Any other such jobs of lower priority are returned to the pool.

The matrix required for the cost-score algorithm is now prepared. In step 107 an ordered list of 'n' technicians is prepared. This is the top 'n' technicians from the list prepared in step 102 and modified in step 106. The value of 'n' should be a value close to the maximum number of technicians likely to be in the system at one time. Because of the need for dummy technicians to balance the number of jobs, it is unlikely that there would be too many technicians to fit the matrix, except at the beginning of the day.

Similarly a list of the top 'm' highest priority jobs from the list prepared in step 104 and modified by steps 105 and 106 is prepared (step 108). From this point the routine is the same as for the periodic updating routine 11 to be described below.

Figure 11:
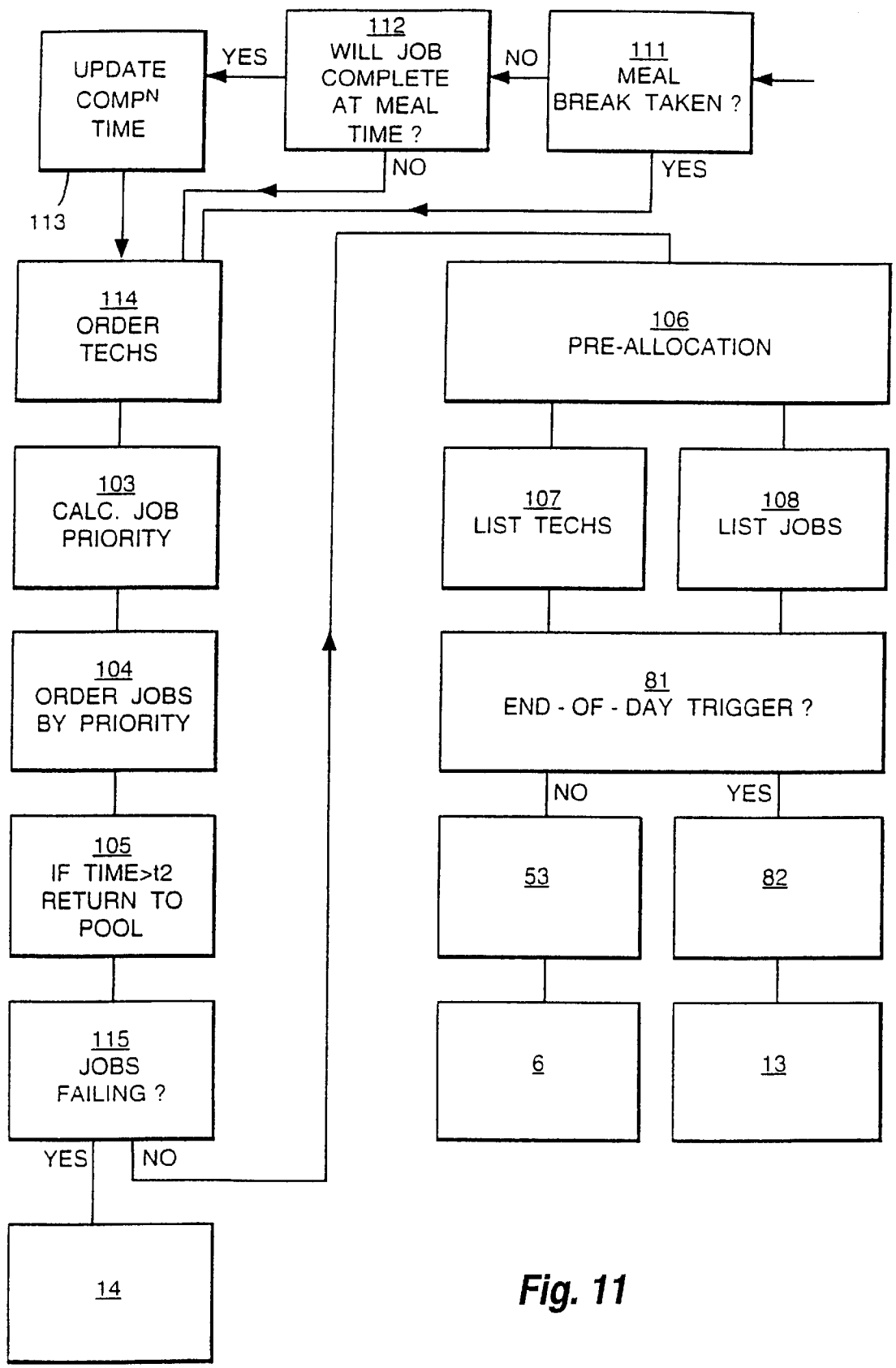
FIG. 11 shows a flow chart showing a periodical updating procedure.

The periodic updating routine shown in FIG. 11 takes place every few minutes. This is done to minimise the amount of processing required when a job request is made, since the information currently held will only be a few minutes out of date and so only a few parameters will need changing in the cost-score matrix for any particular run. These revisions will be predominantly in the estimates of job completion time for those jobs whose earliest estimated completion times have been exceeded. As discussed above, these estimated times include a variability represented by a 'predicted time band'. If the 'time now' has passed the beginning of this 'predicted time band' the probability of completion in the earlier incremental periods of the time band obviously falls to zero, with a consequent rise in the probability of completion falling within any given increment in the remaining part (since there are fewer of them and the total probability must always total 100%). There is also an increased probability of the job falling outside the predicted time band altogether, rising to 100% when 'time now' reaches the end of the 'predicted time band'.

Many of the steps in the updating routine 11 are the same as the start-of-day routine 10. The jobs are prioritised and ordered in the same manner as described with reference to FIG. 10 (step 103, 104, 105).

The technician parameters have to take two further factors into account since the update may occur at any time of day, so the steps are slightly different. In step 111 each technician is assessed as to whether he has yet taken his meal break. If he has, the routine moves straight to step 114 described below. If not, the routine then assesses whether the estimated completion time of his current job is later than the earliest time at which a meal break may be taken. If it is not, the routine again moves straight to step 114, but if it is, the earliest and latest job completion times are updated accordingly, to include the meal break (step 113). In step 114 the technicians are then all arranged in order of their mean estimated completion times, in a similar manner to Step 102 above. (Note that steps 41 (FIG. 4) and 113 may both have modified their times since the last run).

Step 103, 104, 105, 106, 107, 108, are then carried out as for the start of day routine 10 described above.

The end-of-day step 81, described above with reference to FIG. 8, is next carried out. If the trigger point has passed the end-of-day routine 13 is entered. Otherwise a jump is now made to step 53, where the two lists are used to prepare the cost-score matrix, as described with reference to the routine 5. The procedure then jumps to step 53 to update the cost values, but since no technician is on-line it does not allocate infinite cost values or dummy jobs as in routine 5 (step 54) and enters the main allocation routine (FIG. 6). The start of day routine 10 follows a similar procedure but does not go through the 'end-of-day' test 81 before entering the main allocation routine (FIG. 6).

Although to retain maximum flexibility it is preferable to inform each technician of the next job required of him only when the previous one is completed, for operational reasons it is desirable to have details of the second job to be done available to the technician. This is a provisional allocation, as the circumstances may have changed by the time the first job is completed: for example a more urgent job may need to be allocated to him instead. Details of this second job can be communicated to the technician's terminal H1, which will only display them if on attempting to reporting completion of his first job, it is unable to contact the control centre.

However, should the technician be unable to report in after completion of the first job he cannot be told of the current optimal job. In these circumstances he would instead go to the (possibly non-optimal) second job, and on finishing that job he would again attempt to report completion.

Figure 12:
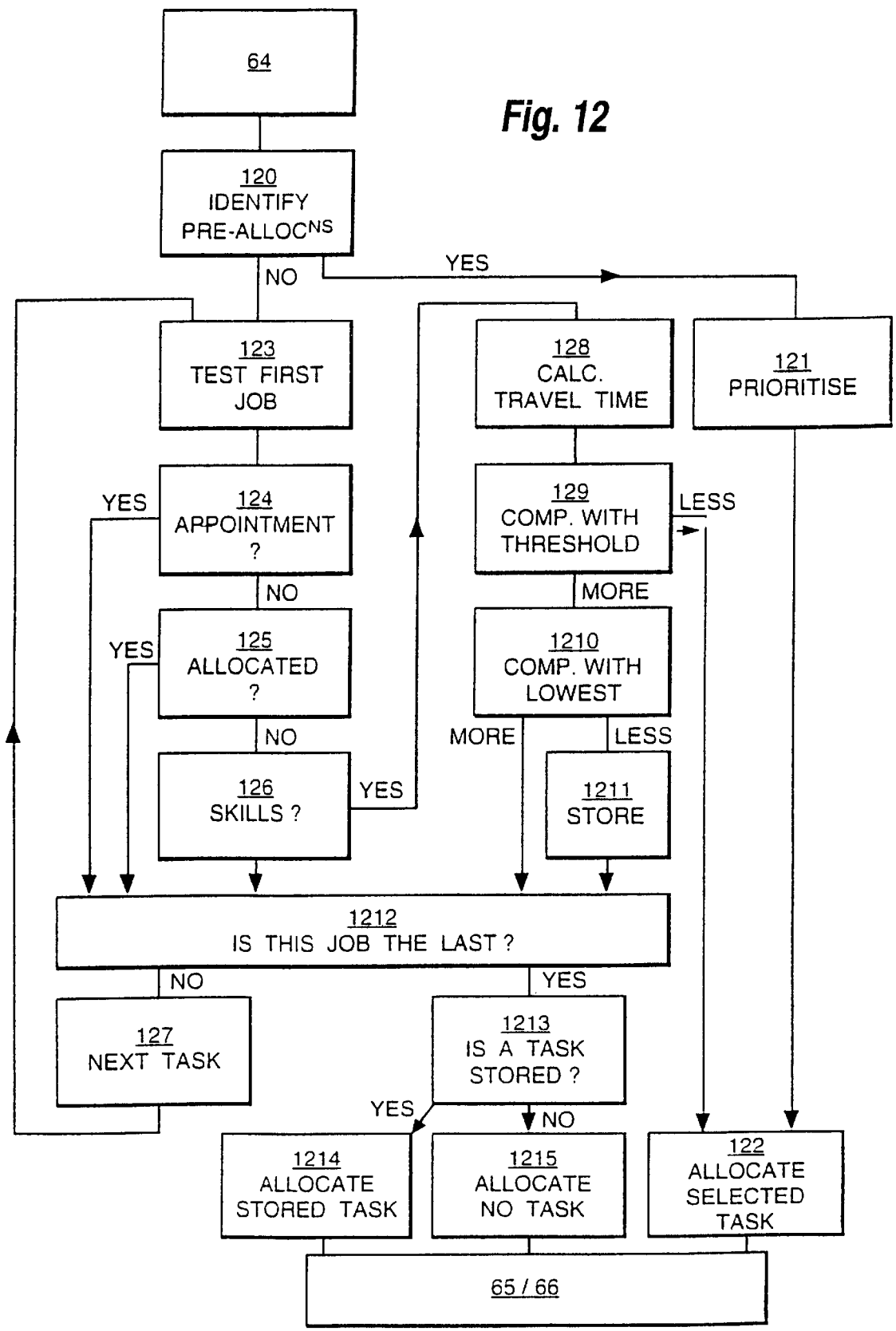
FIG. 12 shows a sub routine for allocating a second job to an operative which forms an optional part of the routine of FIG. 6.
Figure 13:
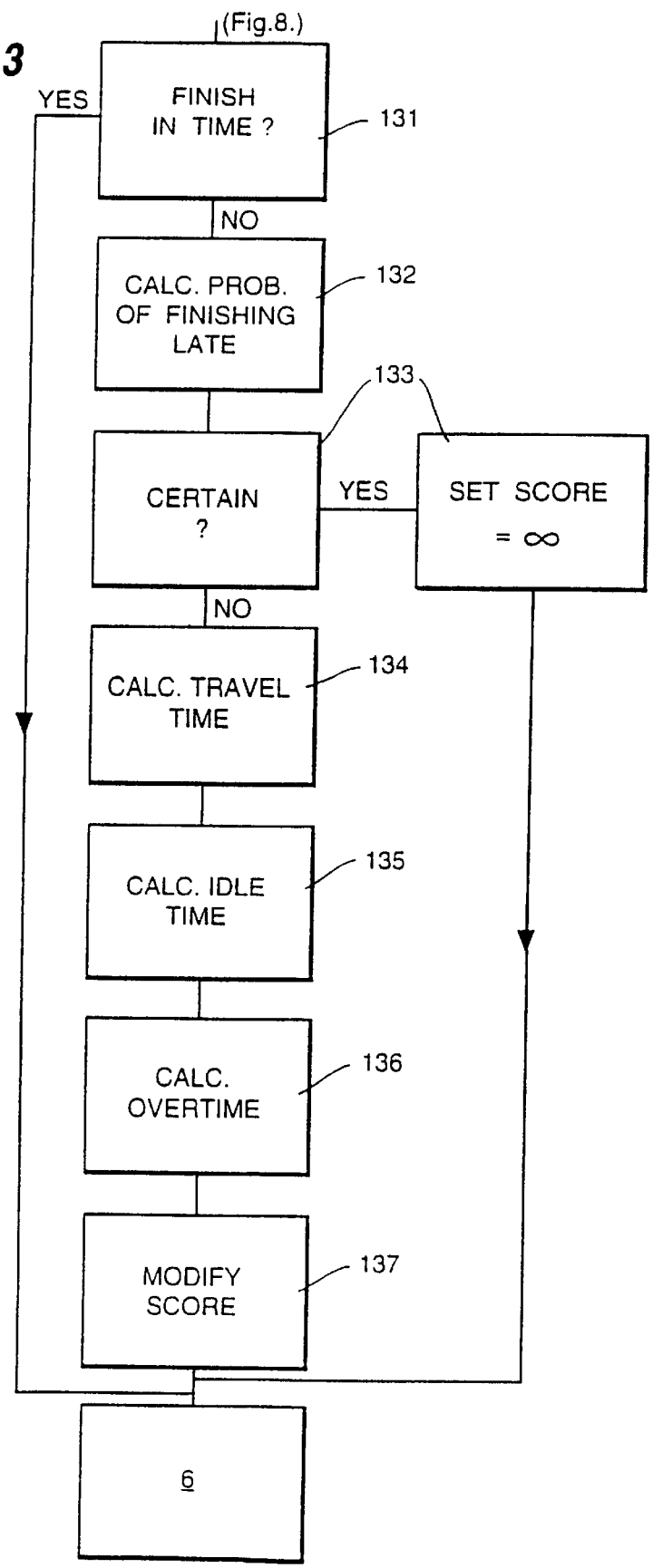
FIG. 13 shows a flow chart for the end-of-day procedure.

The routine 12 for allocating the second jobs will now be described, with reference to FIG. 12. It forms part of the main allocation routine 6 shown in FIG. 6.

In step 120 the pool of work is examined to identify any jobs to be specifically allocated to the technician. If there are any such jobs, these are arranged in priority order (step 121) and the highest priority such job is selected. This is allocated as the technician's second job (step 122) and the allocation routine continues (FIG. 6).

If no such pre-allocated jobs are identified is step 120 the prioritised list of jobs is then searched (steps 123 to 1212).

The highest priority job is tested first (step 123). Three tests are carried out to check if the job has an appointment time (step 124), if it has been allocated as a second job already (step 125), or if it requires skills that the technician does not have (step 126). If any of these conditions are met, it is not suitable as a provisional second job for that technician and the procedure than checks whether this is the last job in the list (step 1212) and, if not, goes to the next job (step 127) and starts the procedure again.

The travelling time between the technicians current job and the prospective job is calculated (step 128) and compared with a threshold value (step 129). If it is less than the threshold value the job is allocated as the second job (step 122) and the allocation routine 6 continues (FIG. 6). If the travelling time is more than this threshold value a further test (step 1210) is carried out to determine if the travelling time is less than that for any previously tested job.

If it is, the job is temporarily stored (step 1211) and in either case the procedure then checks whether this is the last job (step 1212) and if not, selects the next job (step 127).

If the sub-routine fails to find a job satisfying the tests of steps 124, 125, 126 and 129, on the last iteration of step 1212, which tests for the last job in the priority list, will be positive. The sub-routine then follows step 1213, which tests for whether any job has been stored as a result of step 131 and is so, allocates it as the second job for that technician (step 1214). If no job has been stored by step 1211 (because no jobs met the tests of steps 124, 125 and 126, then no second job is allocated (step 1215). In either case the procedure then returns to the main allocation routine 6 (FIG. 6).

The end-of-day routine 13 (FIG. 13) will now be described.

Towards the end of a technician's working day (or part day) the feasibility of a particular allocation is dependent not only on whether the targeted committed time can be met but also on the ability of the technician to complete the job and return to his finish (end of day) location by the end of his working day (or end of working day plus overtime if overtime is permitted). Similarly, the costs involved include not only the travel time to the job but also the travel time from the last Job of the day the finish (end of day) location, any slack time or "time with nothing to do" between the end of the technician's last job and his end of working day and also any overtime incurred if the job over-runs the end of the technician's working day. These additional costs can be accommodated within the cost score calculations for jobs allocated towards the end of the technician's day by introducing additional terms to represent:

travel time from the last job to the technician's finish (end of day) location idle time, if any, between completion of the job and the end of day time overtime incurred, if any, if the job over-runs the technician's end of day The calculations necessary are as follows:

For each allocation of technician to job (regardless of job commitment type or whether the technician is on-line or off-line) calculate the estimated latest home time i.e. the estimated latest time at which a technician can return to his finish (end of day) location following the completion of the allocated job. (Step 130).

If the technician's estimated latest home time is much earlier than his end of day time then no adjustment is necessary to the previously calculated cost score (Step 131). However, it the technician's estimated latest home time is close to, or after, his end of day time then additional calculation will be necessary (Step 132).

These involve first calculating the estimated earliest home time i.e. the earliest time at which a technician can return to his finish (end of day) location following completion of the allocated job.

The probability that the technician will not get to his finish (end of day) location by his end of day time (or end of overtime-day time, if overtime is permitted) after undertaking the allocated job can then be calculated.

If the probability that the technician cannot get to his finish (end of day) location by his end of overtime-day time is high the allocation is likely to become infeasible. The corresponding cost score should then be assigned an infinite value. (Step 133).

However, if the probability is an intermediate value further calculations are needed to determine the values of the additional terms which need to be incorporated into the cost score:

Travel time from the last job to the technicians's end of day location; (Step 134)

Expected Idle time: (Step 135).

If the technician is likely to complete the allocated job and arrive at his finish (end of day location) before his end of day time he will incur idle time or time with "nothing to do". This period of time is unproductive and will be penalised in a similar manner to time spent travelling.

Expected Overtime: (Step 136)

If the technician is likely to complete the allocated job and arrive at his finish (end of day) location after his end of day time he will incur overtime. Overtime is paid at a higher rate than normal working hours, thus any overtime incurred should be penalised at a higher penalty than travel time. These factors, including the probability of their occurrence, are used in step 137 to modify the cost score values to be used in the cost-score matrix (FIGS. 6).

The 'interrupt' routine 14 shown in FIG. 14 will now be described. This routine identifies technicians engaged on low-priority work who can be called to interrupt their current task in order to save a higher-priority task from failing. This possibility may occur if the technicians current job (or bundle) is long, and the higher-priority job had not entered the system when the current job was allocated to him. The routine requires means to be available to page the technicians, rather than wait for them to report in.

When a high-priority job is identified as being an imminent failure (e.g. because its cost score which is dependant on probability of failure and cost of failure, exceeds a threshold) it is first checked as to whether it has been pre-allocated to an individual (Step 140). If so, a jump is made to step 143 (to be described below). Otherwise, a search is made for any technicians at the same location with the necessary skills (Step 141). If there is one, a jump is made to step 143. If there are more than one, jump is made to step 144 (to be described below). If there are none, a search is made for technicians not currently engaged on work of the same or higher priority with the necessary skills and within a travelling distance short enough to reach the job in time to prevent failure. (Step 142). If there is such a technician, or several, a jump is made to step 143 or step 144 respectively. If no such technician is available, the job is identified as impossible. (It is however maintained in the system in case a technician becomes available to do it unexpectedly early).

In step 143, the technician is paged. He is then instructed and the job and technician details updated (steps 65, 66, 67, 68—FIG. 6). The interrupted job is re-entered as a new job, pre-allocated to the technician who was working on it.

In step 144 the selection continues by excluding any technicians with a job of the same or higher priority than the one in jeopardy. Of the remainder, one technician is selected on the basis of criteria such as travel distance, skill preferences and estimated time to completion of current job (step 145) and the routine this continues with step 143.

FIG. 18 shows a functional block diagram of the resource allocation system shown in FIG. 1. Data flows are indicated by the arrows. It shows an input/output device 180 for transmitting data to and receiving data from the handsets H1, H2 etc over communications links. Data received from technicians is used to update a store 181 which contains parameters of the technicians. Data on technicians may also be entered by means of a terminal 182. Parameters on jobs are entered via terminal 182 as well as being fed in automatically from fault alarms generated in the network N. Parameters of jobs are stored in store 183.

Using the parameters stored in stores 181 and 183, calculation means 184 determines the time at which a technician will complete his present job which is stored as another parameter. Similarly, calculation means 185 uses the data stored in store 183 to determine a cost function for each job.

Prioritising means 186 then selects technicians from store 181 having the nearest task-completion times, and prioritising means 187 selects from store 183 those jobs which are nearest their target times, and passes the jobs and technicians to a calculation means 188 which calculates the projected cost of allocating each job to each technician. Pre-allocation means 189 may be provided to identify jobs which are to be allocated to specific technicians. The output of this is fed to an adjustment means 1810 for adjusting the cost of allocating a job to a technician to be infinite if the job and techician are incompatible. Factors other than specific assignments identified by pre-allocation means 189 are also read from stores 181 and 183 by adjustment means 1810. These infinite values derived in adjustment means 1810 are fed to calculation means 188. The costs determined in calculation means 188 and adjustment means 1810 are then assessed in allocation means 1811 to determine the optimum combination of jobs with technicians. This optimum combination is communicated to the technician though device and the allocation means 1811 also sends updating information to stores 181 and 183.

What is claimed is:

1. A method of allocating a plurality of resources to a plurality of jobs, by using a computer to perform the following steps:

determining the time at which each resource is forecast to become available;

determining the time at which each job is required to be performed;

assigning to each job a time-dependent cost function calculated as a function of the time at which the job will be performed;

for each possible combination of jobs with resources, determining the total projected cost, dependent on the time at which each resource is forecast to be available and the value of the cost function for the respective job at that time;

determining the combination which produces the smallest total projected costs;

allocating the resources based on the determined combination; and generating an output based on the allocating of the resources.

2. A resource allocation method using a method according to claim 1, wherein when a resource becomes available the steps of claim 1 are performed, the available resource being assigned to the job which is associated with it in the combination having the smallest cost.

3. A method as claimed in claim 2, wherein if a second resource becomes available at or near to its forecast time and no other changes have occurred since the allocation determination was last performed, the second resource is assigned the job allocated to it in the lowest-cost combination previously determined.

4. A method according to claim 2, wherein when a first job is assigned to a resource, other jobs closely related to the first job and compatible with the resource are also assigned to the resource.

5. A resource allocation method as claimed in claim 2, wherein new jobs may be added to the plurality of jobs, the steps of claim 1 being performed when such additions take place.

6. A method as claimed in claim 1 wherein combinations of resources and jobs which are incompatible are ascribed substantially infinite cost values.

7. A method according to claim 6, wherein a resource may be allocated to a specific job, such that combinations of that job with other resources are treated as incompatible.

8. A method according to claim 1, wherein if the cost value of a first job exceeds a threshold value, a resource is instructed to interrupt a second job which it is currently engaged on and perform the first job instead.

9. A method of allocating a plurality of resources to a plurality of jobs, by using a computer to perform the following steps:

determining the time at which each resource is forecast to become available;

determining the time at which each job is required to be performed;

assigning to each job a time-dependent cost function calculated as a function of the time at which the job will be performed;

determining the total projected cost for combinations of jobs with resources, dependent on the time at which the resource is forecast to be available and the value of the cost function for the respective job at that time;

determining the combination which produces the smallest total projected cost;

allocating the resources based on the determined combination; and generating an output based on the allocating of the resources, wherein the jobs are prioritized on the basis of the times at which they are to be performed, and the resources are prioritized on the basis of those which are forecast to become available first, the jobs and resources having the highest priority are selected, and the cost evaluation is performed for each possible combination of the selected jobs and resources.

10. A method according to claim 9, wherein the predetermined number of resources is less than the predetermined number of jobs, the cost values of jobs not being allocated to resources being included in the cost evaluation.

11. Apparatus for allocating a plurality of resources to a plurality of jobs comprising:

means for storing parameters relating to the resources;

means for storing parameters relating to the jobs;

means for determining from the parameters the time at which each resource is forecast to become available;

means for determining from the parameters the time at which each job is required to be performed;

means for assigning to each job a cost function which is calculated as a function of the time at which the job will be performed;

means for determining, for each possible combination of jobs with resources, the projected cost, dependent on the time at which each resource is forecast to be available and the value of the cost function for the respective job at that time;

means for determining the combination which produces the smallest total projected costs;

means for allocating the resources based on the determined combination; and means for generating an output based on the allocating of the resources.

12. Apparatus according to claim 11, further comprising means for adding new jobs to the plurality of jobs.

13. Apparatus according to claim 11, further comprising means for identifying incompatible combinations for jobs with resources and means for ascribing infinite cost values to such combinations.

14. Apparatus according to claim 13, comprising means for selectively allocating a specific resource to a given job, wherein combinations of such a job with other resources are identified as incompatible.

15. A resource allocation system comprising allocation apparatus according to claim 11, in combination with a plurality of communications terminals for use by the resources, and a communications network for communicating between the terminals and the allocation apparatus.

16. A resource allocation system according to claim 15, the allocation apparatus further comprising means for allocating a provisional second job to each resource, the terminals comprising means for storing said second job details, means for attempting to report job completion to the allocation apparatus, and means for displaying the stored details of the second job only if such an attempt fails.

17. A system as claimed in claim 15, wherein the terminals are portable.

18. A system as claimed in claim 15, wherein the communications network is a radio network.

19. A system as claimed in claim 15, wherein the terminals are connectable to a fixed telecommunications network.

20. A system as claimed in claim 15, wherein the terminals are arranged to receive said output from the allocation apparatus.

21. A system as claimed in claim 20, wherein the terminals include memory means to store said output.

22. A system as claimed in claim 15, wherein the terminals are arranged to send information to the allocation apparatus.

23. A system as claimed in claim 15, wherein the terminals are arranged to allow paging of the resources by the allocation apparatus.

24. Apparatus according to claim 11, in combination with a network on which the jobs are to be performed, said network including means for detecting faults in the network, and means for supplying, to said means for storing parameters relating to the jobs, parameters of jobs to be performed to rectify the faults so detected.

25. Apparatus according to claims 24, arranged such that the parameters supplied include an assessment of the priority of the job to the performed, made wholly or in part on the basis of the availability of spare capacity in the network.

26. Apparatus according to claim 25, arranged such that if there is no spare capacity, such that service is interrupted, the job is allocated the highest priority.

27. Apparatus for allocating a plurality of resources to a plurality of jobs comprising:

means for storing parameters relating to the resources;

means for storing parameters relating to the jobs;

means for determining from the parameters the time at which each resource is forecast to become available;

means for determining from the parameters the time at which each job is required to be performed;

means for assigning to each job a cost function which is calculated as a function of the time at which the job will be performed;

means for prioritizing jobs and/or resources;

means for selecting the jobs and resources with the highest priority;

means for determining, for each possible combination of the selected jobs with the selected resources, the projected cost, dependent on the time at which each resource is forecast to be available and the value of the cost function for the respective job at that time;

means for determining the combination which produces the smallest total projected costs;

means for allocating the resources based on the determined combination; and means for generating an output based on the allocating of the resources.

28. A computer apparatus for allocating a plurality of jobs to a plurality of resources, said computer apparatus comprising a central processing unit, a memory, an input device and an output device, said memory containing a program for controlling the computer and which is arranged:

to store parameters relating to the resources;

to store parameters relating to the jobs;

to determine from the parameters the time at which each resource is forecast to become available;

to determine from the parameters the time at which each job is required to be performed;

to assign to each job a cost function which is calculated as a function of the time at which the job will be performed;

to determine, for each possible combination of jobs with resources, the projected cost, dependent on the time at which each resource is forecast to be available and the value of the cost function for the respective job at that time;

to determine the combination which produces the smallest total projected cost;

to allocate the resources based on the determined combination; and to generate an output based on the allocating of the resources.

29. Apparatus according to claim 28, further arranged to add new jobs to the plurality of jobs.

30. Apparatus according to claim 28, arranged to identify incompatible combinations of jobs with resources and to ascribe infinite cost values to such combinations.

31. Apparatus according to claim 30, further arranged to selectively allocate a specific resource to a given job, wherein combinations of such a job with other resources are identified as incompatible.

32. A computer apparatus for allocating a plurality of jobs to a plurality of resources, said computer apparatus comprising a central processing unit, a memory, an input device and an output device, said memory containing a program for controlling the computer and which is arranged to:

to store parameters relating to the resources;

to store parameters relating to the jobs;

to determine from the parameters the time at which each resource is forecast to become available;

to determine from the parameters the time at which each job is required to be performed;

to assign to each job a cost function which is calculated as a function of the time at which the job will be performed;

to prioritise jobs and/or resources;

to select the jobs and resources with the highest priority;

to determine, for each possible combination of selected jobs with selected resources, the projected cost, dependent on the time at which each resource is forecast to be available and the value of the cost function for the respective job at that time;

to determine the combination which produces the smallest total projected cost;

to allocate the resources based on the determined combination; and to generate an output based on the allocating of the resources.

33. A method of allocating a plurality of resources to a plurality of jobs, by using a computer to assign a projected cost for each possible combination of resources with jobs, calculate the lowest-cost combination, allocate the resources based on the calculated lowest-cost combination and generate an output based on the allocating of the resources, wherein more jobs than resources are used for the calculation, un-assigned jobs being assigned to dummy resources with a cost value for such assignments being determined as a function of the cost of the job not being done.

34. A method according to claim 33, in which jobs are selected for calculation of cost combinations such that jobs having different characteristics are selected in preference to jobs having similar characteristics.

35. A method of allocating a plurality of resources to a plurality of jobs, by using a computer to assign a projected cost for each possible combination of resources with jobs, calculate the lowest-cost combination, allocate the resources based on the calculated lowest-cost combination and generate an output based on the allocating of the resources, wherein when the lowest-cost combination is calculated, a first job is assigned to a resource, and any jobs closely related to the first job are also assigned to the resource.

36. A method of allocating a plurality of resources to a plurality of jobs, by using a computer to assign a projected cost for possible combinations of resources with jobs, calculate the lowest-cost combination, allocate the resources based on the calculated lowest-cost combination and generate an output based on the allocating of the resources, wherein, of a group of closely related jobs, having different priorities, the highest priority job is selected for combination calculations and, when the lowest-cost combination is calculated, a first job is assigned to a resource, and any jobs closely related to the first job are also assigned to the resource.

37. A method of allocating a plurality of resources to a plurality of jobs, by using a computer to assign a projected cost for each possible combination of resources with jobs, calculate the lowest-cost combination, allocate the resources based on the calculated lowest-cost combination and generate an output based on the allocating of the resources, wherein jobs are assigned priority values and target times, and wherein high priority jobs are monitored such that if a high priority job approaches its target time, a resource working on a lower-priority job is instructed to interrupt the lower-priority job and perform the high priority job.

38. Apparatus for allocating a plurality of resources to a plurality of jobs comprising:

first means for storing parameters relating to the resources;

second means for storing parameters relating to the jobs;

means for determining from the parameters the time at which each resource is forecast to become available;

means for determining from the parameters the time at which each job is required to be performed;

means for assigning to each job a cost function which is calculated as a function of the time at which the job will be performed;

means for determining, for each possible combination of jobs with resources, the projected cost, dependent on the time at which each resource is forecast to be available and the value of the cost function for the respective job at that time;

means for determining the combination which produces the smallest total projected cost;

means for allocating the resources based on the determined combination; and means for generating an output based on the allocating of the resources, said apparatus being used in combination with a network on which the jobs are to be performed, said network including means for detecting faults in the network, and means for supplying, to said second means for storing, parameters of jobs to be performed to rectify the faults so detected.

* * * * *